(12) United States Patent
Hammitt et al.

(10) Patent No.: US 7,330,911 B2
(45) Date of Patent: Feb. 12, 2008

(54) ACCESSING A MEMORY USING A PLURALITY OF TRANSFERS

(75) Inventors: Gregory F. Hammitt, Eagan, MN (US); Kevin J. Stuessy, Minnetonka, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 11/328,480

(22) Filed: Jan. 9, 2006

(65) Prior Publication Data

US 2006/0112201 A1  May 25, 2006

Related U.S. Application Data

(62) Division of application No. 10/323,521, filed on Dec. 18, 2002, now Pat. No. 7,062,577.

(51) Int. Cl.
*G06F 13/00* (2006.01)
*G06F 13/14* (2006.01)
*G06F 3/00* (2006.01)
*G06F 13/18* (2006.01)

(52) U.S. Cl. .................. 710/5; 710/6; 710/36; 710/40; 710/52; 710/55

(58) Field of Classification Search ................ 711/149, 711/141, 144; 710/5, 6, 36, 52, 55
See application file for complete search history.

(56) References Cited

U.S. PATENT DOCUMENTS

| | | | |
|---|---|---|---|
| 5,003,459 A * | 3/1991 | Ramanujan et al. ........... 711/3 |
| 5,163,142 A | 11/1992 | Mageau ...................... 711/142 |
| 5,337,409 A | 8/1994 | Sakata ........................ 345/501 |
| 5,737,569 A | 4/1998 | Nadir et al. ................. 395/476 |
| 5,745,732 A | 4/1998 | Cherukuri et al. ............ 710/20 |
| 5,905,725 A | 5/1999 | Sindhu et al. ............... 370/389 |
| 5,915,128 A | 6/1999 | Bauman et al. ................ 710/60 |
| 6,032,232 A | 2/2000 | Lindeborg et al. .......... 711/149 |
| 6,170,041 B1 | 1/2001 | LeVasseur et al. .......... 711/149 |
| 6,374,329 B1 * | 4/2002 | McKinney et al. ......... 711/141 |
| 6,442,656 B1 | 8/2002 | Alasti et al. .................. 710/52 |
| 6,560,675 B1 | 5/2003 | Aho et al. ................... 711/118 |
| 6,636,518 B1 | 10/2003 | Liencres .................. 370/395.7 |
| 6,711,627 B2 | 3/2004 | Chiu .......................... 710/40 |
| 6,715,035 B1 | 3/2004 | Colglazier et al. .......... 711/118 |
| 6,810,470 B1 | 10/2004 | Wiseman et al. ........... 711/163 |
| 6,848,024 B1 * | 1/2005 | Rowlands et al. .......... 711/118 |
| 2002/0161967 A1 * | 10/2002 | Kirihata et al. ............. 711/105 |

OTHER PUBLICATIONS

"AMBA™ Specification" (Rev. 2.0), May 13, 1999, 230 pages.

* cited by examiner

*Primary Examiner*—Kim Huynh
*Assistant Examiner*—Joshua D Schneider
(74) *Attorney, Agent, or Firm*—Christopher P. Maiorana PC

(57) ABSTRACT

A method of operating a circuit, comprising the steps of (A) buffering a read signal received within a plurality of first transfers to the circuit, (B) transmitting the read signal in a second transfer from the circuit, (C) buffering a first write signal received in a third transfer to the circuit and (D) transmitting the first write signal within a plurality of fourth transfers from the circuit.

20 Claims, 16 Drawing Sheets

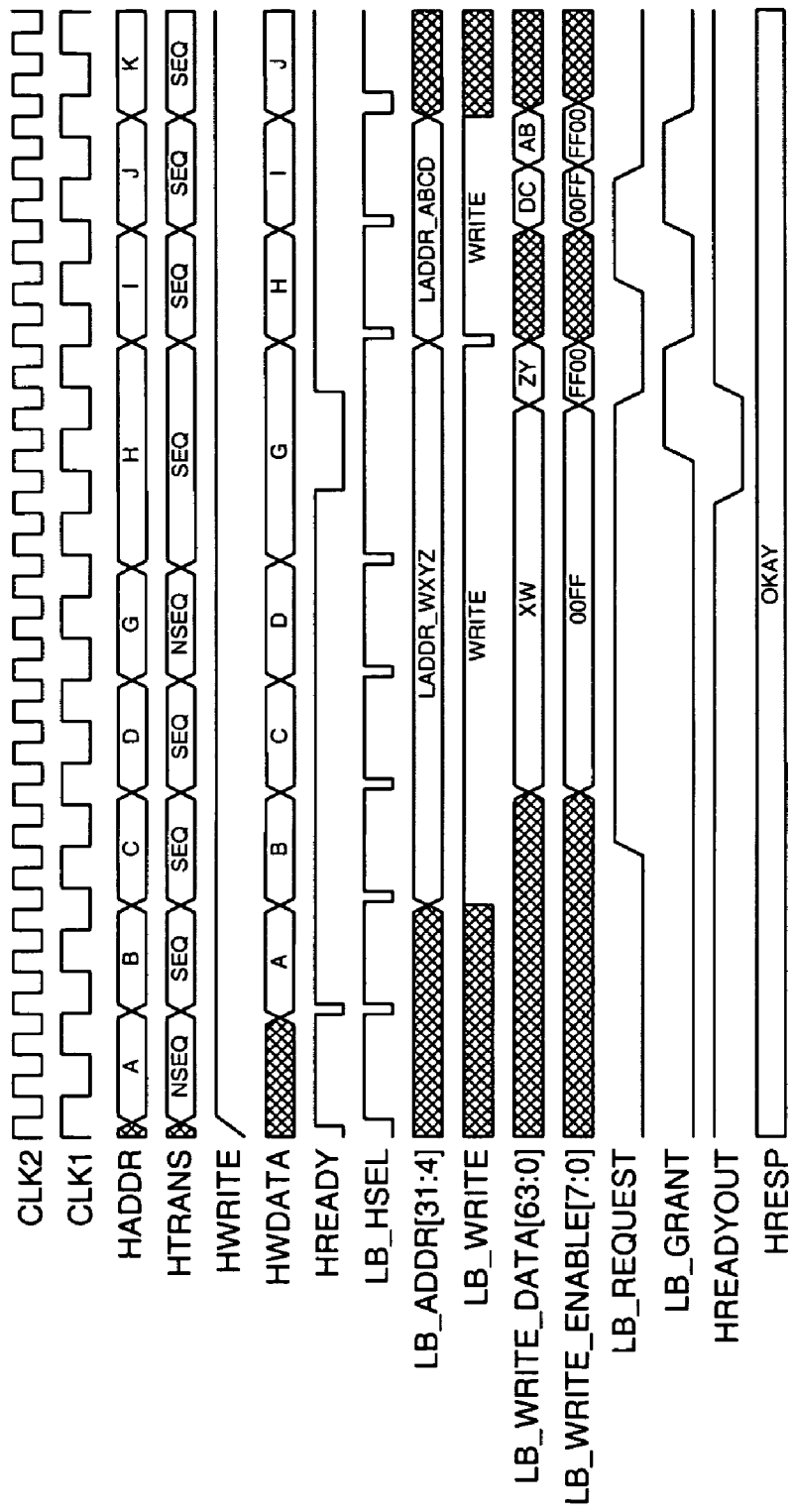

ACCESSING A MEMORY USING A PLURALITY OF TRANSFERS

This is a divisional of U.S. Ser. No. 10/323,521 filed Dec. 18, 2002, now U.S. Pat. No. 7,062,577.

FIELD OF THE INVENTION

The present invention relates to multiport devices generally and, more particularly, to line buffers for a multiport advanced micro-controller bus architecture (AMBA) slave device.

BACKGROUND OF THE INVENTION

Multiport slave peripheral circuit designs are commonly a single monolithic block within an application specific integrated circuit (ASIC). The monolithic block approach creates difficulties in reusing all or portions of the design since the design is customized for the original ASIC application. Where portions of the design are reused, maintenance becomes difficult where the reused blocks are modified in order to be fully integrated with other blocks in the new application.

Another limitation of the monolithic block approach is encountered where bus traffic at a particular port varies among and/or within applications. For example, a multiport Advanced High-performance Bus (AHB) application may use a bus A to support very bursty but short traffic requests while a bus B may use 64-bit, long linear requests. A monolithic block optimized for bus A will not perform as well with bus B. What is desired is a reusable multiport slave peripheral architecture where a line buffer function can be repeated and scaled to meet a wide number of bus interfaces to any one or more different bus designs, speeds and widths.

SUMMARY OF THE INVENTION

The present invention concerns a method of operating a circuit, comprising the steps of (A) buffering a read signal received within a plurality of first transfers to the circuit, (B) transmitting the read signal in a second transfer from the circuit, (C) buffering a first write signal received in a third transfer to the circuit and (D) transmitting the first write signal within a plurality of fourth transfers from the circuit.

The objects, features and advantages of the present invention include providing line buffers for a multiport slave device that may provide (i) an AMBA interface, (ii) big and little endian compatibility, (iii) multiple storage lines for read data, (iv) one or more storage lines for write data, (v) compile-time programming of data path widths, (vi) synchronous operation and/or (vii) AHB-Lite compatibility.

BRIEF DESCRIPTION OF THE DRAWINGS

These and other objects, features and advantages of the present invention will be apparent from the following detailed description and the appended claims and drawings in which:

FIG. 17 is a timing diagram of an example write with arbitration delay.

DETAILED DESCRIPTION OF THE PREFERRED EMBODIMENTS

Figure 1:
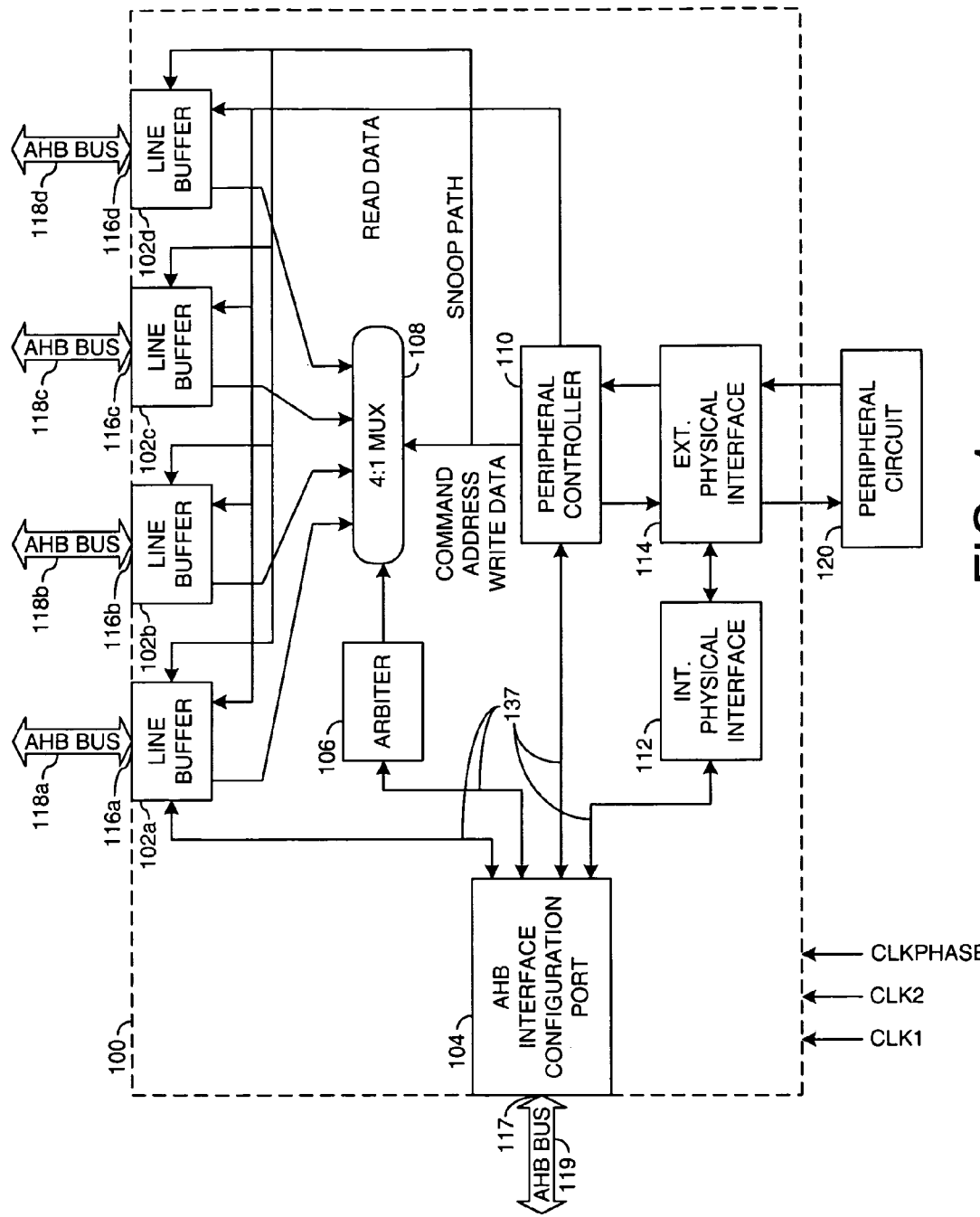
FIG. 1 is a block diagram of an example system in accordance with a preferred embodiment of the present invention.

Referring to FIG. 1, a block diagram of an example system 100 is shown in accordance with a preferred embodiment of the present invention. The system 100 generally comprises multiple line buffer circuits or blocks 102a-d, a configuration port circuit or block 104, an arbiter circuit or block 106, a multiplex circuit or block 108, a peripheral controller circuit or block 110, an optional internal physical interface circuit or block 112, and an optional external physical interface circuit or block 114. Each line buffer circuit 102a-d may have an interface 116a-d configured to couple to a bus 118a-d external to the system 100. The configuration port circuit 104 may have an interface 117 configured to couple to a configuration bus 119 external to the system 100. The external physical interface block 114 may be connectable to a peripheral circuit or block 120 external to the system 100. The block 112 may provide for initialization and control of the block 114 by converting (e.g., parallel to serial) generic bus signals from and to the block 104 into specific signals received and generated by the block 114.

In one embodiment, the peripheral controller circuit 110 and the external interface circuit 114 may be designed to interface to a double data rate (DDR) memory type of peripheral circuit 120. The DDR memory circuit 120 and the system 100 may be fabricated on separate chips and packaged in a multi-chip package. In other embodiments, the peripheral controller circuit 110 may be configured as a random access memory (RAM) controller, a read-only memory (ROM) controller, a mass memory drive controller, an input/output device controller, a communications link controller, or the like. The operational external physical interface circuit 114 may be omitted where the peripheral controller circuit 110 may interface directly to the peripheral circuit 120. In one embodiment, the peripheral circuit 120 and the system 100 may be fabricated on the same chip.

Each bus 118a-d may be implemented as an Advanced High-Performance Bus (AHB) defined in an "Advanced Microcontroller Bus Architecture (AMBA) Specification", revision 2.0, 1999, published by ARM Limited, Cambridge, England and hereby incorporated by reference in its entirety. A number of the line buffer circuits 102a-d may be varied to match a number of the AHB busses 118a-d. The line buffer circuits 102a-d may also be configured to interface to other types of busses and various configurations of the AHB bus to meet the criteria of the particular application. The variations may include bus width, bus speed, endianness and/or allowed transfer types.

The configuration bus 119 may be configured as an AHB bus. In one embodiment, the configuration bus 119 may be configured as an Advanced Peripheral Bus (APB) as defined by the AMBA specification. Other busses may be used as the configuration bus 119 to meet a design criteria of a particular application.

Each line buffer circuit 102a-d generally acts as a mini cache that may reduce references to the peripheral controller circuit 110. The line buffer circuits 102a-d may include multiple (e.g., two to eight) read line or read input registers (FIG. 2) to support caching of read data from the peripheral controller circuit 110. One or more (e.g., one to four) write line or write input registers (FIG. 4) may be provided to support caching of write data received from the bus 118. Each read input register and write input register may be compile-time configured to a predetermined bit-width (e.g., 128-bits or 256-bits).

Each bus interface 116a-d may be compile-time configured to a predetermined data-width (e.g., 32-bits or 64-bits). Some of the interfaces 116a-d may be configured to connect to 32-bit busses 118a-d while other interfaces 116a-d may be simultaneously configured to connect to 64-bit busses 118a-d. Other arrangements of bus widths, speed and/or protocol may be implemented to meet a criteria of a particular application. For example, each interface 116a-d may be configured to accommodate a 64-bit data-width even though a particular AHB bus 118a-d may have a 32-bit data-width. Therefore, the upper 32 data bits of each interface 116a-d may be inactive. In another example, the line buffer circuits 102a-d may be implemented to not respond with certain types of transfer responses (e.g., SPLIT and RETRY) defined in the full AMBA specification.

The line buffer circuits 102a-d may provide configurable data width translations and a number of data beats between the AHB busses 118a-d and the peripheral controller circuit 110. Generally, each transfer of data between the line buffer circuits 102a-d and the peripheral controller circuit 110 (e.g., READ DATA and WRITE DATA) may be as wide or wider than transfers between the line buffer circuits 102a-d and the AHB busses 118a-d. Each transfer of data between the line buffer circuits 102a-d and the peripheral controller circuit 110 may be implemented as two or more (e.g., two or four) data beats.

The line buffer circuits 102a-d may provide endian translations between the AHB busses 118a-d and the peripheral controller circuit 110, as appropriate. For example, the peripheral controller circuit 110 may treat data as little endian while the AHB busses 118a-d may treat data as big or little endian. Other combinations of big and little endianness may be provided to meet a criteria of a particular application.

Address information (e.g., ADDRESS) may be transferred from the AHB busses 118a-d to the peripheral controller circuit 110 with or without modification depending upon configuration bits set within the line buffer circuits 102a-d through the configuration port circuit 104. Control information (e.g., CONTROL) may be generated by each line buffer circuit 102a-d for accessing the peripheral controller circuit 110. A set of signals (e.g., SNOOP_PATH) may be tapped from the multiplexer circuit 108 and provided to the line buffer circuits 102a-d to handle cases where a first line buffer circuit 102a-d may be preparing to read from an address that a second line buffer circuit 102a-d may be preparing to write.

Each line buffer circuit 102a-d may be configured as an AHB slave device that buffers requests to the peripheral controller circuit 110. Each line buffer circuit 102a-d may be compiled to run at an AHB bus frequency or an integer multiple faster than a line buffer clock (e.g., CLK1), with zero wait states. Some internal logic of the line buffer circuits 102a-d may run at twice the rate of the bus or the line buffer clock CLK1. Most signals presented from the line buffer circuits 102a-d may run at the line buffer clock CLK1 rate, although some may be clocked at a midpoint of the clock. Flip-flops (not shown) within the line buffer circuits 102a-d may actually be clocked on a rising edge of a double rate line buffer clock (e.g., CLK2), enabled when a phase signal (e.g., CLKPHASE) may be in a logical high state. Some write data signals may be clocked at the higher line buffer clock rate CLK2. The line buffer circuits 102a-d may fetch and/or write data in 256/128-bit lines, where 256-bit or 128-bit may be a compile option. Use of an 8-word or 4-word line registers or buffers generally provides a compromise between a low latency and a high throughput for the line buffer circuits 102a-d. Using only 256-bit or 128-bit requests to the peripheral controller circuit 110 may simplify control logic (FIG. 4) of the peripheral controller circuit 110 compared with designs accepting 256, 128, 64, 32 and 16-bit requests.

Each line buffer circuit 102a-d generally has memory space for an integer number of line buffer sets each comprising two 256-bit or 128-bit lines of read data. A first line buffer or register may contain data for an "even" line of data while a second line buffer or register may contain the data for an "odd" line. Each line buffer circuit 102a-d generally uses bit 5 or bit 4 of a read request address to determine even versus odd lines. A write side of the line buffer circuits 102a-d may use an integer number of line buffer or register sets each comprising a 256-bit or 128-bit line to accumulate the write data. The accumulation of the write data may be performed in a register set called a gathering register. A single line entry first-in-first-out (FIFO) buffer, called a dispatch register, may be used to buffer the write data to the arbiter circuit 106 and/or the peripheral controller circuit 110.

The line buffer circuits 102*a-d* may be viewed similar a direct-mapped cache. Reads of the data may be out of order and data not read may be dumped without penalty. The direct-cache like features may be important since the AHB bus masters (not shown) may request more data than actually read onto an AHB bus 118 (e.g., an AHB bus master may make an 8-beat data request and terminate the request before all eight transactions are finished).

Data to and/or from the arbiter circuit 106 and/or the peripheral controller circuit 110 may be transferred in two 128-bit or 64-bit segments for a 2-beat internal configuration, and four 64-bit or 32-bit segments for a 4-beat internal configuration. The read data transfers may occur at the line buffer clock CLK1 rate and the write transfers may occur at the line buffer clock CLK2 rate.

Figure 2:
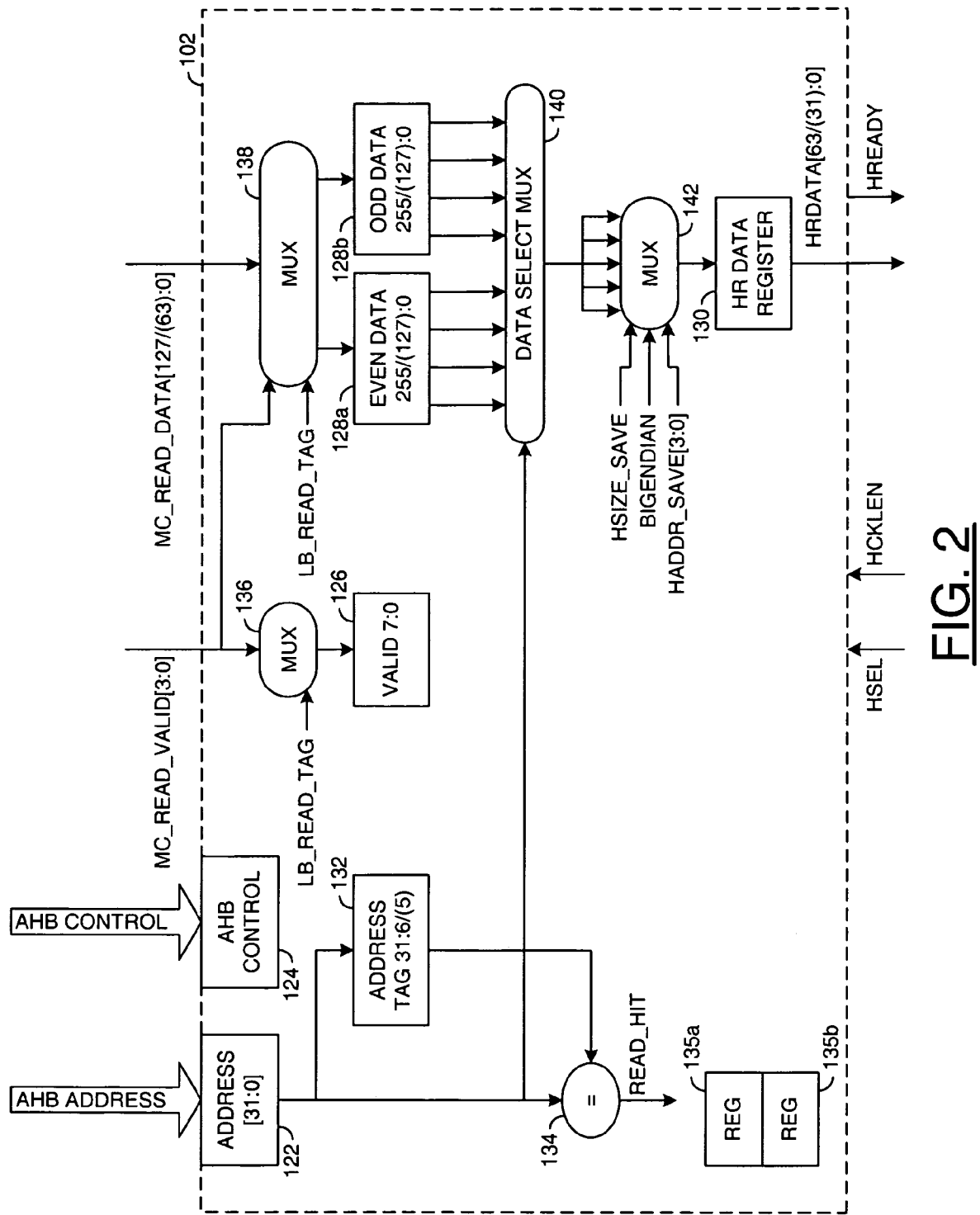
FIG. 2 is a block diagram of an example implementation of a read portion of a line buffer circuit.

Referring to FIG. 2, a block diagram of an example implementation of a read portion of a line buffer circuit 102 is shown. The read portion of the line buffer circuit 102 generally comprises an address register or block 122, a control register or block 124, a valid register or block 126, an even data line read input buffer, register or block 128*a*, an odd data line read input buffer, register or block 128*b*, a data read output register or block 130, an address tag register or block 132, a comparison circuit or block 134, one or more registers or blocks 135*a-b*, a read valid multiplexer circuit or block 136, a read data multiplexer circuit or block 138, a data select multiplexer or block 140, and an output data multiplexer circuit or block 142. For both read and write operations, the address register 122 and the control register 124 may be loaded only when a signal (e.g., HSEL) is asserted. The signal HSEL may also be captured on every rising edge of line buffer clock CLK1 when an active AHB cycle may be detected with an enable signal (e.g., HCLKEN) is asserted.

The registered AHB signals may be decoded in a data phase of a request cycle to determine whether a read may be a hit or miss of the line buffer circuit 102. Specifically, during a phase one (e.g., first one-half cycle) of the line buffer clock CLK1, contents of the address register 122 may be compared with contents of the address tag register 132 by the comparison circuit 134. If the contents of the address register 122 and the address tag register 132 are equal, and an appropriate valid bit is set, a read hit signal (e.g., READ_HIT) may be asserted as true. If the AHB request is also a valid read (e.g., no errors), the data read output register 130 may be loaded with the appropriate data signal (e.g., HDATA[31:0]) and a ready signal (e.g., HREADY) may be asserted.

If a read hit did not occur on a valid read request, a read miss may be indicated by a false value for the signal READ_HIT. The read miss generally causes the requested line of data to be fetched from the peripheral controller circuit 110 via the arbiter circuit 106. The read miss may result in the AHB bus 118 being placed in a wait condition until the requested data may be available where the system 100 may be configured to not perform a SPLIT or RETRY transaction. In one embodiment where the peripheral controller circuit 110 may be a memory controller circuit and the external peripheral circuit may be an external memory circuit, the data may be read from the external memory circuit 120.

Different configurable sizes of the read input registers 128*a-b* and some signals may be indicated by a format "first size/(second size)" (e.g., [255/(127):0]). The address register 122, control register 124 and data read output register 130 may have a predetermined size determined by the AHB bus 118. The valid register 126 size may not change with a change in a size of the line width. The valid register 126 may be sized as two sets of 4-bits. Each set of 4-bits may indicate a presence/absence of a valid word in a respective position within one of the even/odd line read input registers 128*a-b*. Therefore, each bit of the valid register 126 may provide a status of one-fourth (or other integer fraction) of the even/odd line read input registers 128*a-b*.

A signal (e.g., LB_READ_TAG) may be provided to the valid multiplexer circuit 136 and the read data multiplexer circuit 138. The signal LB_READ_TAG generally indicates if a data signal (e.g., MC_READ_DATA[127/(63):0]) may be intended for the even line read input register 128*a* or the odd line read input register 128*b*. A single bit of the signal LB_READ_TAG vector may determined between the odd line and the even line. The bit may only be good if set correctly when the read request was made and the corresponding bit of the signal LB_REQUEST_TAG was set. The signal LB_READ_TAG may also direct a valid data signal (e.g., MC_READ_VALID[3:0]) to an upper half or a lower half of the valid register 126.

The address signal saved in the address register 122 may be provided to the data select multiplexer circuit 140. The 4th or 5th bit of the address value may determine if the requested read data should be obtained from the even line read input register 128*a* or the odd line read input register 128*b*. The addressed read data may then be provided to the output data multiplexer circuit 142.

A size signal (e.g., HSIZE_SAVE), an endian signal (e.g., BIGENDIAN), and an address save signal (e.g., HADDR_SAVE[3:0]) may be provided to the output data multiplexer circuit 142. The signals HSIZE_SAVE, BIGENDIAN, and HADDR_SAVE[3:0] may direct an appropriate portion of the data signal (e.g., a fourth of the 256/(128)-bit line of data) from the data select multiplexer circuit 140 to the data read output register 130 with a proper endian conversion. Each portion may be either 64-bits or 32-bits of data.

A first of the registers 135*a* may be implemented as a write flush control register. A second of the registers 135*b* may be implemented as a unaligned access control register. The registers 135*a-b* may be programmed and read through the configuration port circuit 104 via a register bus 137 (FIG. 1).

Figure 3:
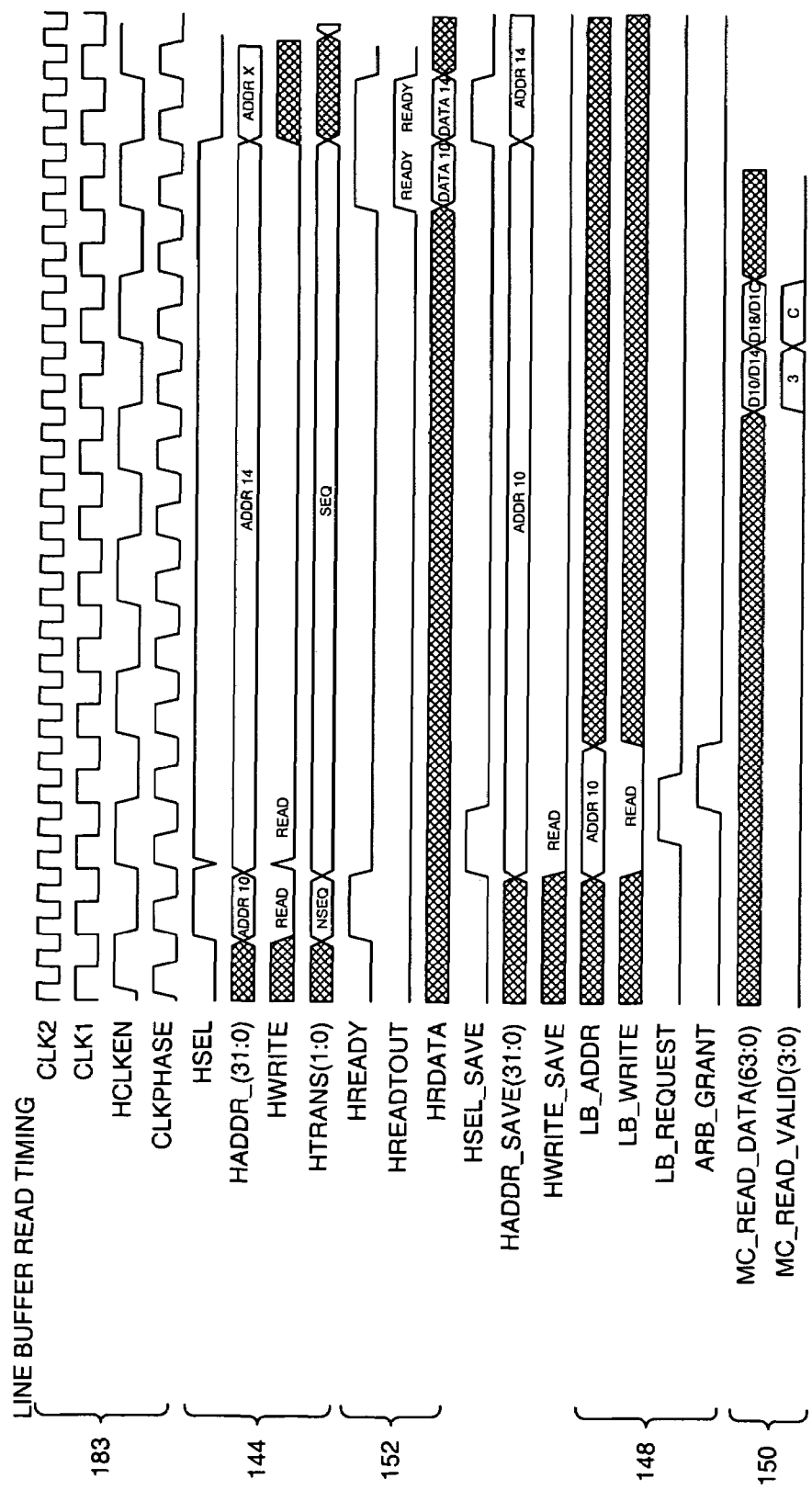
FIG. 3 is a timing diagram for an example read miss of data and a read hit in a line buffer circuit.

Referring to FIG. 3, a timing diagram for an example read miss and a read hit of data in a line buffer circuit 102 is shown. Also included may be some sample timing waveforms within the other blocks that make up a multiport memory controller type of system 100. An AHB bus master may request a read by asserting the appropriate AHB bus signals (e.g., bracket 144) to read data at an address 10 and an address 14. The line buffer circuit 102 may respond by accepting the read request to the address 10 which, in the example illustrated, results in a read miss. The line buffer circuit 102 may thus hold off the read request to the address 14 until the request to the peripheral controller of address 10 is fulfilled (e.g., bracket 152). The line buffer circuit 102 may respond to the read miss by requesting a read for the address 10, request arbitration, and receive a grant to access the peripheral (e.g., memory) controller circuit 110 (e.g., bracket 148). The memory controller circuit 110 may read the data from the address 10 as well as the address 14, an address 18 and an address 1C (hexadecimal) (e.g., bracket 150). The line buffer circuit 102 may then present the data for the address 10 (e.g., bracket 152). Since the transfer of data from the memory controller circuit 110 to the line buffer circuit 102 may include the data for the address 14, the line buffer circuit 102 may respond to the subsequent read request at the address 14 with a read hit and immediately present the data read from the address 14.

Figure 4:
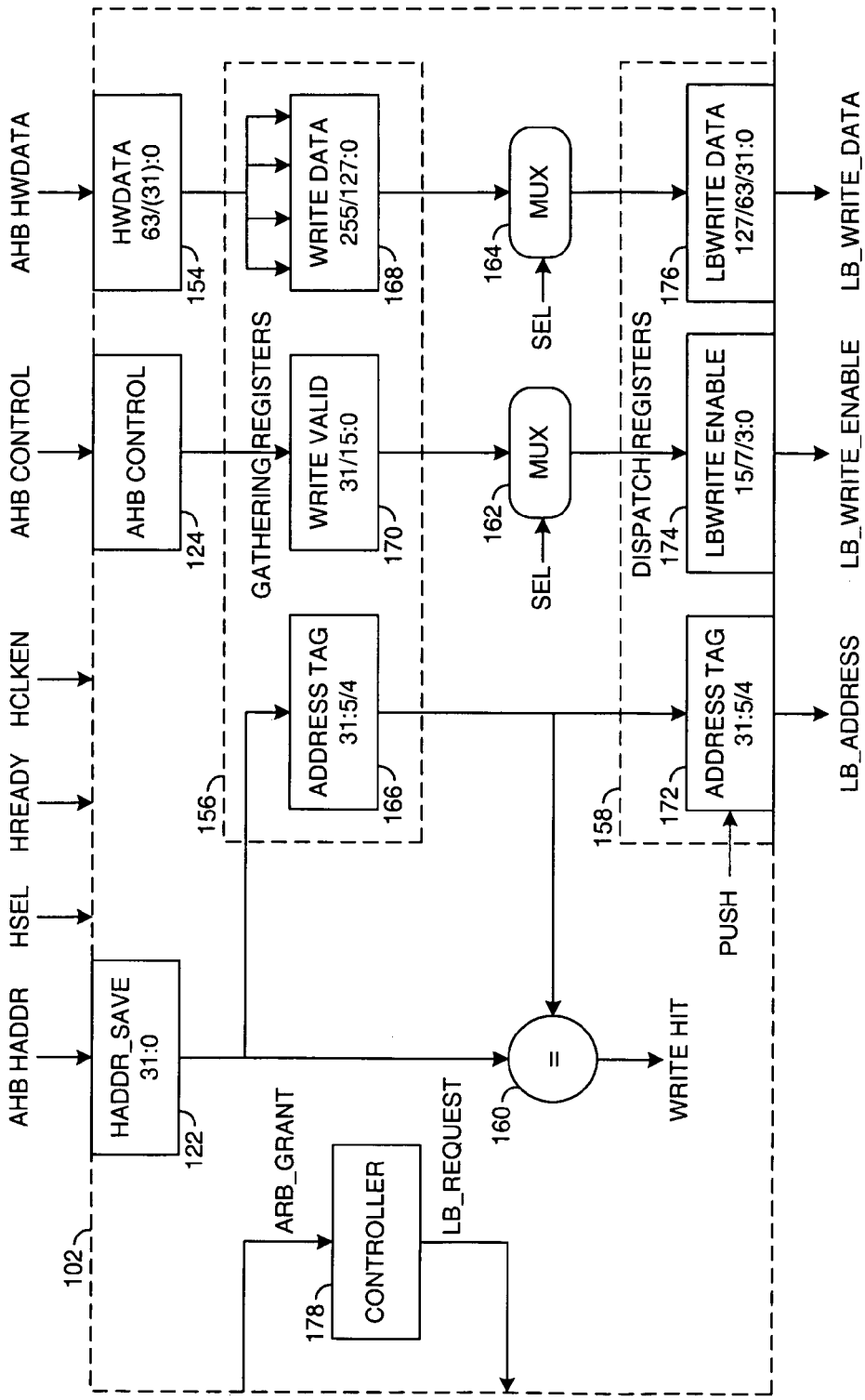
FIG. 4 is a block diagram of an example implementation of a write portion of the line buffer circuit.

Referring to FIG. 4, a block diagram of an example implementation of a write portion of the line buffer circuit 102 is shown. The write portion of the line buffer circuit 102 generally comprises the address register 122, the control register 124, a data write input register or block 154, a gathering register or block 156, a dispatch register or block 158, a comparison circuit or block 160, a word valid multiplexer circuit or block 162, and a write data multiplexer circuit or block 164. For both read and write operations, the address register 122 and the control register 124 may be loaded only when the select HSEL and the ready signal HREADY are asserted. The select signal HSEL signal may also be captured on every rising edge of line buffer clock CLK1 when an active AHB cycle may be detected with the enable signal HCLKEN asserted. The registered AHB signals may be decoded in a data phase of a requested cycle to determine whether a write may be a hit or a miss.

During phase one (e.g., a first one-half cycle), contents of the address register 122 may be compared to a contents of a write address tag register 166 within the gathering registers circuit 156. If the contents of the address register 122 and the write address tag register 166 are equal and the write request is valid, a write hit may be indicated by asserting a signal (e.g., WRITE_HIT) in the true state. The ready signal HREADY may thus be asserted, or stay asserted, on a falling edge of line buffer clock CLK1. The write data signal (e.g., HWDATA[63/(31):0]) may be captured on a rising edge of line buffer clock CLK1 following the assertion of select signal HSEL and the ready signal HREADY with the enable signal HCLKEN asserted. Write data from the data write input register 154 may then be transferred to a proper byte/half-word/word/double-word of a write data register or block 168 and the proper bit(s) may be set/cleared in a write valid register or block 170, both within the gathering registers circuit 156, on a rising edge of line buffer clock CLK1.

If the write address/write address tag comparison is false and the write dispatch register 158 not busy, the information in the write address tag register 166, the write valid register 170, and the data write output register 168 may be pushed into the write dispatch register 158. A signal (e.g., PUSH) may command an address tag register or block 172, a write enable register or block 174, and a data write output register or block 176 within the dispatch register circuit 158 to record the information from the gathering registers circuit 156. A signal (e.g., SEL) provided to the multiplexer circuits 162 and 164 may determine which portions of the write valid register 170 and the data write output register 168 are moved to the dispatch register circuit 158.

An independent controller circuit or block 178 may then assert a request signal (e.g., LB_REQUEST) to the arbiter circuit 106. After a grant signal (e.g., ARB_GRANT) is asserted, the write generally completes to the memory controller circuit 110. In one embodiment, the controller circuit 178 may be implemented as a state machine. A write address signal (e.g., LB_ADDRESS), a write enable signal (e.g., LB_WRITE_ENABLE) and a write data signal (e.g., LB_WRITE_DATA) may be presented by the dispatch register circuit 158 to the arbiter circuit 106. If the push or dispatch cannot be accomplished because the write dispatch register circuit 158 may be busy (e.g., a line of write data has not been written to the memory controller circuit 110), the ready signal HREADY may be negated until the arbiter circuit 106 may grant the previous write and a write dispatch register busy flag (not shown) may be negated.

In one embodiment, the data write output register 168 may be implemented as an even data register or block and an odd write data register or block to provide an increased write data cache capability. Appropriate multiplexer circuits or blocks (e.g., similar to the multiplexer circuits 138 and 140 in FIG. 2) may be included within the gathering register circuit 156 to direct the write data to and from either the even write data register or the odd write data-register. Furthermore, a data width of the data write input register 154, the data write output register 168, the data write output register 176, the write valid register 170 and the write enable register 174 may be configured at a compile-time to account for different configurations of the line buffer circuits 102a-d.

Figure 5:
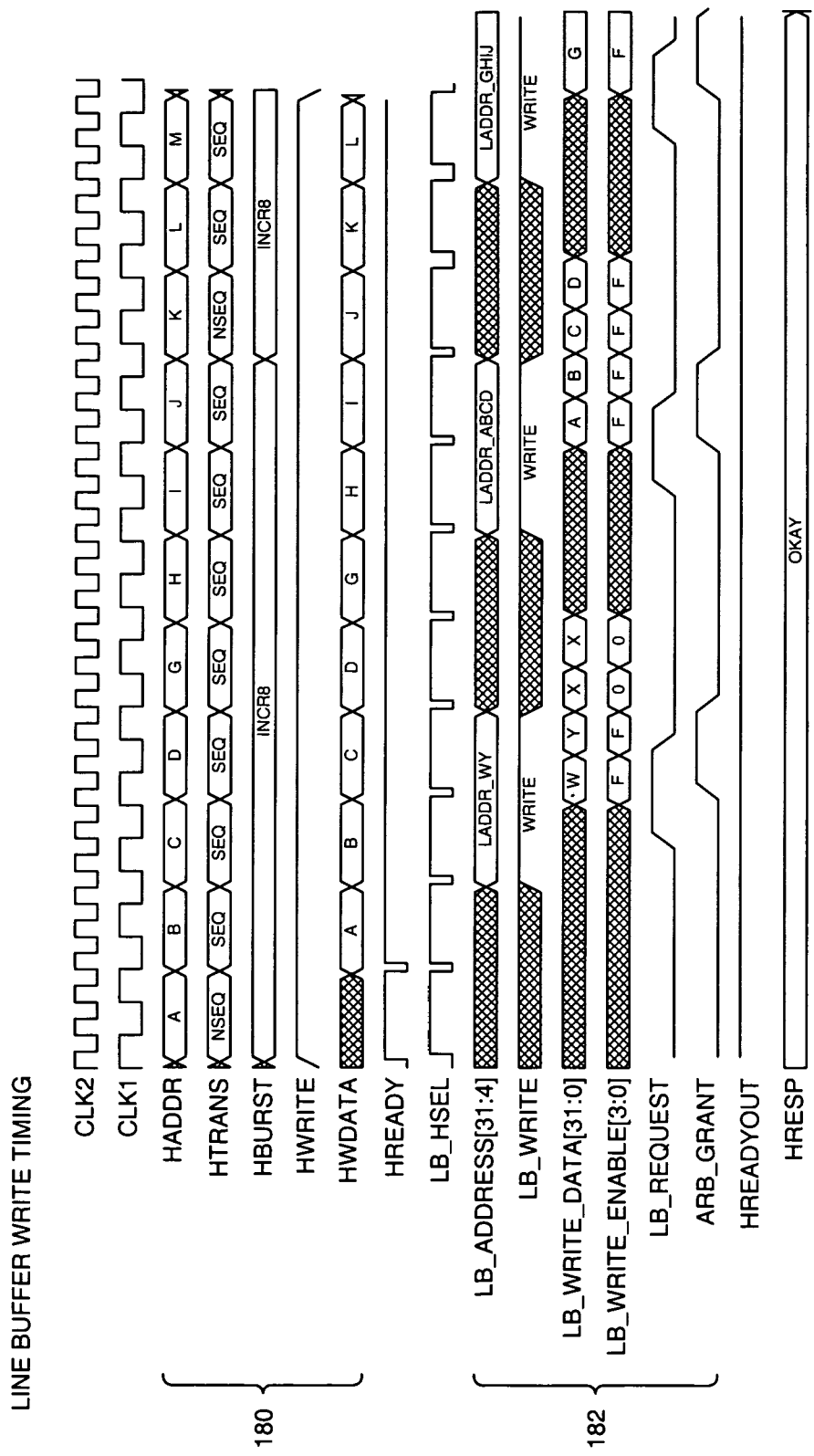
FIG. 5 is a timing diagram of an example write burst resulting in a 4-beat write transfer to a memory controller circuit.

Referring to FIG. 5, a timing diagram of an example write burst resulting in a 4-beat write transfer to the memory controller circuit 110 is shown. For the example, data "WY" may be initially stored in the line buffer circuit 102. Furthermore, not all of the write data may be valid in the 'WY' transfer. An AHB bus master (not shown) may request a write by asserting the appropriate AHB bus signals (e.g., bracket 180) to write multiple sequential data items (e.g., A-M).

The line buffer circuit 102 may initially clear the data items W and Y already buffered (e.g., bracket 182). The data items marked 'X' may indicate "don't care" data used to fill the 4-beat write to the memory controller circuit 110. The invalid data X may be identified by an enable signal (e.g., LBWRITE_ENABLE[3:0]) having a value of zero. Thereafter, the line buffer circuit 102 may write the first four write data items A-D in a subsequent 4-beat write to the memory controller circuit 110. The 4-beat writes to the memory controller circuit 110 may continue until the gathering registers circuit 156 and the dispatch registers circuit 158 may be full. The bus 118a-d may then be waited by deasserting the signal HREADY.

To avoid problems that may be associated with stale data in the line buffer circuit 102, one or more methods may be used to push or dispatch the write data from the write gathering registers 156 to the arbiter circuit 106 and/or the memory controller circuit 110. The methods may include, but may not be limited to a write address tag miss method, a read hit of write data method, a write of locked data method, a read method, a timeout method and a protected write data method. Each method may free the write gathering registers circuit 156 to accept additional write data.

The write address tag miss method may be used where a current AHB write transaction may not be to a same 4-word line as a previous write transaction, causing a write tag miss. The write data of the previous write transaction may be moved to the arbiter circuit 106 and/or the peripheral controller circuit 110 to avoid the current AHB write transaction from overwriting the pervious write data.

The read hit of write data method generally involves a current AHB read transaction of a previous write line. No attempt need be made to forward the write data as the read data. Instead, the read may be treated as a read miss and a write may be complete to the peripheral controller circuit 110 and/or external peripheral circuit 120. After completing the write transaction, a subsequent read transaction from the peripheral controller circuit 110 may occur in fulfillment of the read request. The read hit of write data method may be used for bufferable write data. Unbufferable write data may be automatically dispatched to the peripheral controller circuit 110.

The write of locked data method generally involves a write portion of the locked operation immediately pushing the write data to the peripheral controller circuit 110. Each single write requested may immediately be issued for dispatch to the arbiter circuit 106/108 and/or the peripheral controller circuit 110. Attempted simultaneous writes by other line buffer circuit 102 to the peripheral controller circuit 110 may be blocked by the arbiter circuit 106/108 until the pending locked transaction may be unlocked.

The read method may be used where a current AHB transaction may be a read transaction. All pending writes may be pushed before the read transaction may proceed. For bufferable writes to be dispatched, a predetermined bit (e.g., bit 15) of a write flush control register 135*a* may be in a logical low state.

The timeout method generally pushes a write when an elapsed time from a last write transaction exceeds a timeout value written into predetermined bits (e.g., bits 4:0) of the write flush control register 135*a*. Another bit (e.g., bit 14) of the write flush control register 135*a* may also be set to enable the timeout method. The timeout method of dispatching may be a low priority event.

The protected write data method may involve a protection signal (e.g., HPROT) in an unbuffered state. A protected write transaction may be initiated with the signal HPROT (2)=0 to indicate that the write data may not be bufferable by the line buffer circuit 102. The protected write data may be pushed at an end of a current AHB write transaction to the peripheral controller circuit 110 to prevent buffering in the line buffer circuit 102. An end of the transaction may be marked by a signal (e.g., HTRANS) being driven to a non-sequential (e.g., NSEQ) or and idle (e.g., IDLE) state.

In one embodiment, the write address tag miss method, the read hit of write data method and the write of locked data methods may be continuously active. The other methods may be controlled by the write flush control register 135*a*. The write flush control register 135*a* may store two control bits and a multi-bit.(e.g., five bits) timeout value. Other arrangements of the write flush control register 135*a* may be implemented to meet the criteria of a particular application.

A lock operation is generally a semaphore signal by software (not shown) to other processes running within a system. Hardware may operate in a known consistent manner for the semaphore synchronization to function properly. Synchronization generally involves an immediate completion of all pending writes. Therefore, a locked read or write may dispatch any current data in the gathering registers circuit 156 and then the locked cycle may be dispatched to the peripheral controller circuit 110. Second, a read of lock data may be from the actual external peripheral circuit 120 (e.g., the read may force a read miss on the even/odd line buffer data). Third, no other process may view or alter the read data before the original process has returned the write data.

During a lock operation, the line buffer circuit 102 may inform the arbiter circuit 106 that the read request may be a locked request. The lock information may be sent to the arbiter circuit 106 via a status signal (e.g., LB_STATUS(0)). The arbiter circuit 106 may then ensure that after the read operation begins no other line buffer circuits 102*a-d* may be allowed to read or write the same location. The arbiter circuit 106 may determine how severe a shut down of the other line buffer circuits 102*a-d* may be and with how much logic a designer wishes to use to check for a location match. After the read portion of the locked operation has started, the status signal LB_STATUS(0) is generally held asserted by the line buffer circuit 102 until the actual locked transfer has completed and a signal (e.g,. HMASTLOCK) deasserted on the AHB bus 118. The line buffer circuit 102 may assume that proper bus protocol be maintained on the AHB bus 118 and that no other master may be allowed to make a request during the lock operation.

Each of the line buffer circuits 102*a-d* may implement a hardware assist solution to handle read buffer coherency problems in a system where multiple line buffer circuits 102*a-d* may modify the same address space. Write coherency may be handled by software executing in an AHB master circuit (not shown) via use of atomic (e.g., locked) read-modify-write (RMW) instructions. The hardware may assist the software with known repeatable method of handling the RMW instructions.

To access an area of memory, an AHB master may request and receive permission from a memory allocation processor (not shown) by requesting and receiving a key to access a particular section of a shared memory. The requests/keys may be transferred via the RMW instructions. The allocation processor may insure that no two AHB masters have simultaneous keys to the same memory section.

The software may be assisted by the hardware via "snooping" of writes to the peripheral (e.g., memory) controller circuit 110. Each line buffer circuit 102*a-d* may monitor signals generated by the arbiter circuit 106 for presentation to the memory controller circuit 110. Upon detection of a write, the address of the write may be compared to the address tags stored in the read address tag registers 132. If a line buffer circuit 102*a-d* detects a match, the read data may be invalidated. A future read may result in a miss and the read data may be fetched through the memory controller circuit 110. A special situation may arise when a read buffer data has been requested from the memory controller circuit 110 but not yet received by a line buffer circuit 102. The line buffer circuits may recognize the situation and re-request the read data after the invalid read may be returned by the memory controller circuit 110. The line buffer circuits 102a-d may not snoop write address tags in search of the common write location. If multiple line buffer circuits 102a-d attempt to write to a same memory address, a last write may overwrite earlier writes.

A parallel nature of the accesses to the line buffer circuits 102a-d generally offers an ability to provide unaligned word and half-word transactions. The AMBA bus specification generally does not allow for unaligned accesses stating that unaligned accesses may be ignored. An unaligned word access may be defined where certain bits of a size signal (e.g., HSIZE[2:0]) have a predetermined value (e.g., 010 binary) and certain bits of an address signal (e.g., HADDR [1:0]) have a non-zero value (e.g. ≠00 binary). An unaligned halfword access may be defined as HSIZE[2:0]=001 and HADDR[0]≠0. The methods of detecting unaligned accesses may be controlled by an unaligned access control register 135b.

Normally the AMBA bus instructs a slave node to ignore the least significant bits of the address of a unaligned access. The line buffer circuits 102a-d may ignore the least significant bits of the address signal while the unaligned access control register 135b stores a zero value. Therefore, the line buffer circuits 102a-d may not perform unaligned accesses to memory. The line buffer circuits 102a-d may either treat all accesses as aligned or snoop for unaligned accesses and terminate any with an error response.

A bit 15 of the unaligned access control register 135b may be referred to as an unaligned data detect (UDD) bit. Where the bit 15 may be in the logical one state and the AHB master makes an unaligned data access (e.g., HPROT(0)=1), the line buffer circuit 102 may respond to the access by signaling an error. The error signaling generally allows software in the initiating AHB master to detect the unaligned access with pointers to the instruction that caused the access.

A bit 14 of the unaligned access control register 135b may be referred to as an unaligned opcode detect (UOD) bit. Where the bit 14 may be in the logical one state and the AHB master makes an unaligned opcode access (e.g., HPROT(0)=0), the line buffer circuit 102 may response by signaling an error. While the bit 14 may be in the logical zero state, the unaligned address bits may be ignored by the line buffer circuit 102.

The line buffer circuits 102a-d generally operate with big and little endian masters. Although a particular AHB master may not change the endianness of the system at run time, each AHB master on a multiport system may have a different endianness. Interface data paths among the line buffer circuits 102a-d, the arbiter circuit 106 and the peripheral controller circuit 110 may be defined to be little endian. The interfaces to the arbiter circuit 106 and the peripheral controller circuit 110 may be independent of differences in endianness. The line buffer circuits 102a-d may have a strap pin or input for endianness control. An endianness control logic may take into account an operand size as well as an address to modify the data path for big/little endian references. The endianness may be controlled by the signal BIGENDIAN.

The AMBA Specification generally defines an order of bytes/half-words within a word with an endianness signal. A most significant byte of a word may always be on a byte lane (31:24) regardless if the word may be either big endian or little endian. The same data in the same order may appear in the byte lane (31:24) of the AHB busses 118a-d. An alignment of bytes within a 32-bit word at the external peripheral circuit 120 to an AHB bus 118 may be shown in Table I based upon the size, endianness and address bits dependencies when making aligned accesses:

TABLE I

| HSIZE | BIGENDIAN | HADDR 1:0 | HXDATA 31:24 | HXDATA 23:16 | HXDATA 15:8 | HXDATA 7:0 |
|---|---|---|---|---|---|---|
| 010 | 0 | XX | 3 | 2 | 1 | 0 |
| 010 | 1 | XX | 3 | 2 | 1 | 0 |
| 001 | 0 | 0X | XX | XX | 1 | 0 |
| 001 | 0 | 1X | 3 | 2 | XX | XX |
| 001 | 1 | 0X | 3 | 2 | XX | XX |
| 001 | 1 | 1X | XX | XX | 1 | 0 |
| 000 | 0 | 00 | XX | XX | XX | 0 |
| 000 | 0 | 01 | XX | XX | 1 | XX |
| 000 | 0 | 10 | XX | 2 | XX | XX |
| 000 | 0 | 11 | 3 | XX | XX | XX |
| 000 | 1 | 00 | 3 | XX | XX | XX |
| 000 | 1 | 01 | XX | 2 | XX | XX |
| 000 | 1 | 10 | XX | XX | 1 | XX |
| 000 | 1 | 11 | XX | XX | XX | 0 |

An alignment of bytes within a 64-bit word at the external peripheral circuit 120 to an AHB bus 118 may be shown in Table II based upon the size, endianness and address bits dependencies when making aligned accesses:

TABLE II

| | | HADDR | HXDATA | | | | | | | |
|---|---|---|---|---|---|---|---|---|---|---|
| HSIZE | BIGEND | [2:0] | 63:56 | 55:48 | 47:40 | 39:32 | 31:24 | 23:16 | 15:8 | 7:0 |
| 011 | 0 | xxx | 7 | 6 | 5 | 4 | 3 | 2 | 1 | 0 |
| 011 | 1 | xxx | 3 | 2 | 1 | 0 | 7 | 6 | 5 | 4 |
| 010 | 0 | 0xx | — | — | — | — | 3 | 2 | 1 | 0 |
| 010 | 1 | 0xx | — | — | — | — | 3 | 2 | 1 | 0 |
| 010 | 0 | 1xx | 7 | 6 | 5 | 4 | — | — | — | — |
| 010 | 1 | 1xx | 3 | 2 | 1 | 0 | — | — | — | — |
| 001 | 0 | 00X | — | — | — | — | — | — | 1 | 0 |
| 001 | 0 | 01X | — | — | — | — | 3 | 2 | — | — |
| 001 | 1 | 00X | — | — | — | — | 3 | 2 | — | — |
| 001 | 1 | 01X | — | — | — | — | — | — | 1 | 0 |
| 001 | 0 | 10X | — | — | 5 | 4 | — | — | — | — |
| 001 | 0 | 11X | 7 | 6 | — | — | — | — | — | — |
| 001 | 1 | 10X | 3 | 2 | — | — | — | — | — | — |
| 001 | 1 | 11X | — | — | 1 | 0 | — | — | — | — |
| 000 | 0 | 000 | — | — | — | — | — | — | — | 0 |
| 000 | 0 | 001 | — | — | — | — | — | — | 1 | — |
| 000 | 0 | 010 | — | — | — | — | — | 2 | — | — |
| 000 | 0 | 011 | — | — | — | — | 3 | — | — | — |
| 000 | 1 | 000 | 7 | — | — | — | — | — | — | — |
| 000 | 1 | 001 | — | 6 | — | — | — | — | — | — |
| 000 | 1 | 010 | — | — | 5 | — | — | — | — | — |
| 000 | 1 | 011 | — | — | — | 4 | — | — | — | — |
| 000 | 0 | 100 | — | — | — | 4 | — | — | — | — |
| 000 | 0 | 101 | — | — | 5 | — | — | — | — | — |
| 000 | 0 | 110 | — | 6 | — | — | — | — | — | — |
| 000 | 0 | 111 | 7 | — | — | — | — | — | — | — |
| 000 | 1 | 100 | — | — | — | — | 7 | — | — | — |
| 000 | 1 | 101 | — | — | — | — | — | 6 | — | — |
| 000 | 1 | 110 | — | — | — | — | — | — | 5 | — |
| 000 | 1 | 111 | — | — | — | — | — | — | — | 4 |

Each line buffer circuit 102*a-d* may receive three clocks. Each line buffer circuit 102*a-d* may receive the line buffer clock CLK1 and the double line buffer clock CLK2. The double line buffer clock CLK2 may operate at twice a rate of the line buffer clock CLK1 with a rising edge that may coincide with the edges of line buffer clock CLK1. Finally a clock signal (e.g., INT_R_CLK) may be received by the line buffer circuits 102*a-d* for communication with the configuration port circuit 104. The clock INT_R_CLK may be the same as a signal (e.g., HCLK_CFG) which may have a same frequency as the line buffer clock CLK1 or an integer division of the line buffer clock CLK1. The enable signal CLKPHASE may be a delayed version of the line buffer clock CLK1 and may be used as an enable for the double line buffer clock CLK2 to discern the phases. If the line buffer clock CLK1 has a higher rate than an AHB bus clock (e.g., HCLK), a signal (e.g., HCLKEN) may synchronize the line buffer clock CLK1 to the bus clock HCLK. The signal HCLKEN may be used to slow down transfers on the AHB busses 118*a-d*. When the signal HCLKEN is in a logical high state, a rising edge of the line buffer clock CLK1 may be at an active edge. The line buffer clock CLK1 generally has a 50/50 duty cycle. The double line buffer clock CLK2 may have a less rigorous duty cycle than the line buffer clock CLK1. Example waveforms for the clock signals CLK1, CLK2 and HCLKEN may be shown in FIG. 3 (e.g., bracket 183).

The line buffer circuits 102*a-d* may provide synchronous resets. Registers within the line buffer circuits 102*a-d* that sample inputs from the AHB busses 118*a-d* may be reset by a reset signal (e.g., HRESETn). Read and write valid registers may be reset by either the reset signal HRESETn or an internal reset signal (e.g., INT_R_RESETn). All other buffers and registers internal to the line buffer circuits 102*a-d* may be reset by the internal reset signal INT_R_RESETn. The internal reset signal INT_R_RESETn may typically be a reset from the configuration AHB bus 119. Both reset signals may be asserted for at least a cycle of the line buffer clock CLK1 to be considered active.

The system 100 may be configured into several different configurations through compile options. For the line buffer circuits 102*a-d*, one of the following options may be identified as shown in TABLE III as follows:

TABLE III

| Configuration (Verilog define) | Write Data Bus Width | Byte Write Enable Bus Width |
|---|---|---|
| AP_128_DDR_16_BURST_8 | 31:0 | 3:0 |
| AP_128_DDR_32_BURST_4 | 63:0 | 7:0 |
| AP_256_DDR_32_BURST_8 | 63:0 | 7:0 |
| AP_256_DDR_64_BURST_4 | 127:0 | 15:0 |
| AP_256_DDR_72_BURST_4 | 143:0 | 15:0 |

The compile options may select whether the line widths in the line buffer circuits 102*a-d* may be 128-bits or 256-bits as well as whether the line buffer circuits 102*a-d* employ 2-beat or 4-beat internal transfers with the peripheral controller circuit 110.

A summary of characteristics of one embodiment of the line buffer circuits 102*a-d* may be provided in Table IV as follows:

TABLE IV

| Description | Value |
| --- | --- |
| Endianness | Big endian |
| Width of data bus | 32 or 64-bit |
| AHB response types used | OKAY, ERROR |
| Slave uses MASTLOCK signal | Yes |
| Slave uses HPROT: Only data/opcode and bufferable information may be inputs | Yes |
| Conditions that may trigger the ERROR response: The slave may generate an ERROR response on the AHB bus upon detection of an unaligned access with the unaligned detect logic enabled or if an AHB master requests an unsupported HSIZE transfer. | |

In general, if a line buffer circuit 102 has a read request from an AHB master that may be available from the current even/odd line read input registers 128a-b, the read data may be immediately provided on the AHB bus 118. For the write case, a line buffer circuit 102 may wait the AHB bus 118 if a current state does not allow for another write to be accepted. While the data write input register 154 may be full, the AHB bus 118 may be waited. A length of the wait generally depends on a current arbitration latency to gain access to the peripheral controller circuit 110. For the read miss case, the AHB bus 118 may be waited until the read data is available from the peripheral controller circuit 110.

The configuration port circuit 104 generally provides programming or configuring each of the line buffer circuits 102a-d, the arbiter circuit 106, the peripheral controller circuit 110 and the external peripheral interface circuit 114 (through programming of registers within the internal physical interface circuit 112). As stated above, each of the line buffer circuits 102a-d may include the write flush control register 135a and the unaligned access control register 135b. The contents of the write flush control register 135a may be defined as shown in Table V:

TABLE V

| 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- |
| RF | TE | RES | Reserved | | | | | | | | TC | | | | |

The write flush control register 135a may have a reset value=0X0000 (hexadecimal). A bit (e.g., bit 15) may be referred to as a read flush of bufferable writes data bit (e.g., RF). While the bit RF has the logical zero state, the line buffer circuit 102 may force a flush of bufferable writes pending when an AHB read may be requested. The flush may push write data to the dispatch registers circuit 158. While the bit RF has the logical one state, the line buffer circuit 102 may allow bufferable writes to be buffered during reads. Unbufferable writes may be flushed at the end of an AHB transaction.

The bit (e.g., bit 14) may be referred to as a timeout enable bit (e.g., TE). While the bit TE has the logical zero state, the line buffer circuit 102 may not perform the timeout operation or function. While the bit TE has the logical one state, the line buffer circuit 102 may force a flush of the writes when the timeout count register has reached zero. Both the bits RF and TE may be independent and accumulative in controlling the write flush operation. If the AHB transaction is a locked transaction, the write may be pushed without regard to the write flush control bits in the write flush control register 135a.

Several bits (e.g., bits 0-4) may be referred to as a timeout count load value (e.g., TC) or the timeout count register. The timeout count load value may decrement by one count for each enabled cycle of the line buffer clock CLK1.

The contents of the unaligned access control register 135b may be defined as shown in Table VI:

TABLE VI

| 15 | 14 | 13 | 12 | 11 | 10 | 9 | 8 | 7 | 6 | 5 | 4 | 3 | 2 | 1 | 0 |
| --- | --- | --- | --- | --- | --- | --- | --- | --- | --- | --- | --- | --- | --- | --- | --- |
| UDD | UOD | Reserved | | | | | | | | | | | | | |

The unaligned access control register 135b may have a reset value=0X0000 (hexadecimal). A bit (e.g., bit 15) may be referred to as a unaligned data detect (e.g., UDD) bit. While the bit UDD has the logical zero state, the line buffer circuit 102 may ignore unaligned address bits. While the bit UDD has the logical one state, the line buffer circuit 102 may return the ERROR value in a response signal (e.g., HRESP) upon detecting an unaligned data transaction.

A bit (e.g., bit 14) may be referred to as an unaligned opcode detect (e.g., UOD) bit. While the bit UOD has the logical zero state, the line buffer circuit 102 may ignore unaligned address bits. While the bit UOD has the logical one state, the line buffer circuit 102 may generate the ERROR value in the response signal HRESP upon detecting an unaligned opcode transaction.

Figure 6:
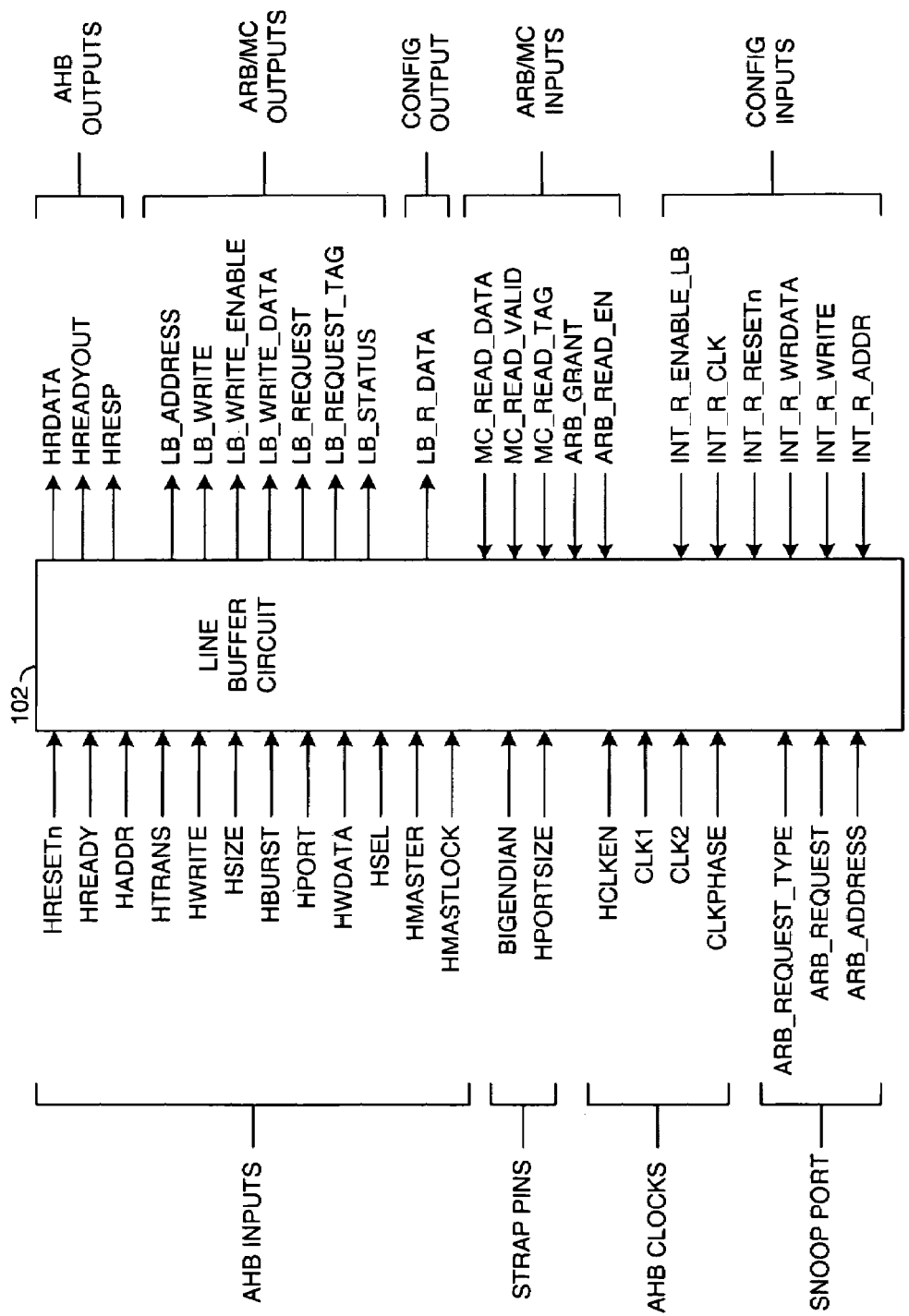
FIG. 6 is a block diagram of a line buffer circuit.

Referring to FIG. 6, a block diagram of a line buffer circuit 102 is shown. The input and output signals for the line buffer circuit 102 may be grouped together based upon signal sources and destinations. The groupings may include, but may not be limited to AHB signals, data/control signals, snoop signals, strap control signals, and control register interface signals.

The AHB busses 118a-d generally act as high-performance system backbone busses. Each AHB bus 118 may support the efficient connection of processors, on-chip memories and off-chip external memory interfaces with low-power peripheral macrocell functions. The AHB bus signals are generally described in the AMBA Specification with additional signals as shown in Table VII:

TABLE VII

| Signal Description | I/O |
|---|---|
| Line Buffer Clock (e.g., CLK1) | In |
| The line buffer clock may time all bus transfers. All signal timings may be related to rising edge of CLK1. If HCLK may be slower than CLK1, signals may be sampled and driven only when HCLKEN may be asserted. | |
| Line Buffer Clock 2× (e.g., CLK2) | In |
| The clock CLK2 may be used in some line buffer logic and by the peripheral controller circuit. | |
| Line Buffer Clock Phase (e.g., CLKPHASE) | In |
| A slightly delayed version of CLK1 and may determine which edge of CLK2 to sample or drive on relative to the clock CLK1. | |
| HCLK Enable (e.g., HCLKEN) | In |
| Used to synchronize CLK1 to the AHB's HCLK domain. If CLK1 may be a higher rate than HCLK, the signal HCLKEN may be used to sync the two domains. | |
| AHB Transfer Done (e.g., HREADYOUT) | Out |
| When in a logical HIGH the HREADYOUT signal may indicate that a line buffer read or write has finished on the bus. HREADYOUT may be driven LOW to extend a transfer. | |

The data and control signals may be provided as shown in Table VIII:

TABLE VIII

| Signal Description | I/O |
|---|---|
| Line Buffer Request Address (e.g., LB_ADDRESS[31:2]) | Out |
| Address of the line buffer circuit line request to the peripheral controller circuit. | |
| Memory Controller Read Data (e.g., MC_READ_DATA[127\|63\|31:0]) | In |
| Multiplexed read data from the peripheral controller circuit to the line buffer circuit. Depending on the line buffer circuit configuration identified, MC_READ_DATA may be 128, 64 or 32 bits. | |
| Line Buffer Write Data (e.g., LB_WRITE_DATA[127\|63\|31:0]) | Out |
| Multiplexed write data from the line buffer circuit to the peripheral controller circuit via an arbiter circuit data path multiplexer. Depending on the line buffer circuit configuration identified, LB_WRITE_DATA may be 128, 64 or 32 bits. Data may be transferred at CLK2 rate. | |
| Line Buffer Write/nRead (e.g., LB_WRITE) | Out |
| Control signal that may be active high for write and active low for read. | |
| Line Buffer Byte Write Enable (e.g., LB_WRITE_ENABLE[15\|7\|3:0]) | Out |
| Active high write enable for each byte of write data of the current transfer. Depending on the line buffer circuit configuration identified, LB_WRITE_ENABLE may be 16, 8 or 4 bits. | |
| Line Buffer Transaction Request (e.g., LB_REQUEST) | Out |
| A signal to an arbiter circuit/translation logic that a memory request may be requested. | |
| Arbiter Transaction Grant (e.g, ARB_GRANT) | In |
| A signal from the arbiter circuit to the line buffer circuit that the request generally has been accepted. | |
| Memory Controller Read Valid (e.g., MC_READ_VALID[3:0]) | In |
| Active high signal that may indicate the data on the read data inputs may be valid. Bit 0 may indicate a least significant quarter of the read line may be present, while bit 3 may indicate a most significant quarter may be present. For a 2-beat internal transfer, 2 of the valid bits may be set per read from the peripheral controller circuit. For a 4-beat mode memory interface, 1 valid bit may be set per read from the peripheral controller circuit. | |
| Line Buffer Status (e.g., LB_STATUS[2:0]) | Out |
| A three bit encoded value that may be sent from the line buffer circuit to the arbiter circuit to indicate transaction status. Bit 0 may represent a state of HLOCK for the current transfer. The bit 0 flag may inform the arbiter circuit that the current transfer may be a locked transfer. | |
| Line Buffer Request Tag (e.g., LB_REQUEST_TAG[4:0]) | Out |
| A five bit quantity generally managed by the line buffer circuit to recognize a particular request. LB_REQUEST_TAG[4] may be a flag representing if the request may be for the even or odd line (e.g., HADDR[5\|4]). LB_REQUEST_TAG[3:0] may be a registered versions of HMASTER for the current transfer. The arbiter circuit and peripheral controller circuit may pass on the value until the read results may be sent back valid to the line buffer circuit. The Tag may not be particularly useful for a simple line buffer circuit that does not handle split transactions, do to the fact that the line buffer circuit may not have multiple active memory cycles at the same time. The line flag may be implemented for the line buffer circuit. The signal HMASTER may be tied off where unused, for example with an AHB-Lite line buffer circuit. | |
| Memory Controller Read Tag (e.g., MC_READ_TAG[4:0]) | In |
| A five bit request tag returned by the peripheral controller circuit that may recognize a particular read request made by the line buffer circuit. In many cases, MC_READ_TAG may be simply reroute back the LB_REQUEST_TAG sent during the request by the line buffer circuit. Bit 4 may be the even/odd line flag that identifies a particular line buffer circuit for which the data may be targeted for. | |
| Arbiter Read Enable (e.g., ARB_READ_EN) | In |
| A single bit decode input from the arbiter circuit/peripheral controller circuit that may be asserted when the current read data may be owned by the respective line buffer circuit. | |

The snoop signals may be provided as shown in Table IX:

TABLE IX

| Signal Description | I/O |
|---|---|
| Transaction Request (e.g., ARB_REQUEST) | In |
| An active high signal to the peripheral controller circuit that a memory request may happen. The signal may be asserted on the rising edge of CLK1 and held asserted for a clock cycle. | |
| Request Address (e.g., ARB_ADDRESS[31:2]) | In |
| An address of the arbiter circuit request to the peripheral controller circuit. | |
| Request Type (e.g., ARB_REQUEST_TYPE[3:0]) | In |
| May indicate a read or write request. For some arbiter circuit/peripheral controller circuit combinations (e.g., a DDR memory controller) more requests types may be defined (e.g., precharge, activate, refresh, etc.). The line buffer circuit may support the read and write types. | |

| Type | Command |
|---|---|
| 0 | No-op |
| 1 | Refresh |
| 2 | Precharge |
| 3 | Active |
| 4 | Write |
| 5 | Read |
| 6-F | No-op |

The strap control signals may be provided as shown in Table X:

TABLE X

| Signal Description | I/O |
| --- | --- |
| Big Endian Mode Strap (e.g., BIGENDIAN) High may set the line buffer circuit to a Big Endian configuration. Low may set the line buffer circuit to a Little Endian configuration. | In |
| AHB Data Bus Width (e.g., HPORTSIZE) High may set the line buffer circuit to a 64-bit active AHB data bus. Low may set the line buffer circuit to a 32-bit active AHB data bus. For LOW, the data may be driven on [31:0]. Note that the physical connection of the data bus may be 64 bits. | In |

A simple bus protocol may be provided to write and read the control registers of each line buffer circuit 102a-d. The following signals generally implement the protocol. The signal may be synchronous with respect to the clock INT_R_CLK unless otherwise noted. The line buffer control register interface signals may be provided as shown in Table XI:

TABLE XI

| Signal Description | I/O |
| --- | --- |
| Register Bus Clock (e.g., INT_R_CLK) A rising edge of INT_R_CLK may be used to time all transfers on a register bus. | In |
| Register Bus Reset (e.g., INT_R_RESETn) A register bus reset signal that may be active LOW and may be synchronous with respect to INT_R_CLK. The reset may be synchronized to the HCLK domain that the configuration register interface may be connected to. INT_R_RESETn may reset most of the internal logic in a line buffer circuit. | In |
| Register Address Bus (e.g., INT_R_ADDR[5:2]) The register address bus may be 4 bits to allow decoding of a 16 word line buffer circuit configuration space. INT_R_ENABLE_LB may be asserted when INT_R_ADDR falls in a space reserved for the line buffer circuit. | In |
| Register Bus Write (e.g., INT_R_WRITE) HIGH generally indicates a register write access and LOW a read access. | In |
| Register Bus Write Data (e.g., INT_R_WRDATA[31:0]) The Register write data bus may contain write data for write transfers. The line buffer circuit may transfer the write data to the register corresponding to INT_R_ADDR. The write data bus may be up to 32-bits wide. | In |
| Line Buffer Address Select (e.g., INT_R_ENABLE_LB) Indicates that the transfer may be intended for the line buffer circuit for a read or a write. In practice, INT_R_ENABLE_LB may be the output of a central address decoder and may adhere to a predetermined timing. | In |
| Register Bus Read Data (e.g., LB_R_RDATA[31:0]) The line buffer circuit may place the register data corresponding to INT_R_ADDR on the LB_R_RDATA bus. | Out |

The control registers 135 a-b may be written and read from across the register busses 137. The register bus 137 to line buffer circuit 102 interface generally provides a communication path between a controlling processor on an AHB bus 118a-d to the line buffer circuits 102a-d via the configuration port circuit 104. The line buffer circuits 102a-d are generally not delivered as a stand-alone design and a central AHB decoder/interface may exist somewhere in the overall design, so the line buffer circuits 102a-d may implement a simple register bus interface that may be controlled by the central AHB decoder/interface.

Figure 7:
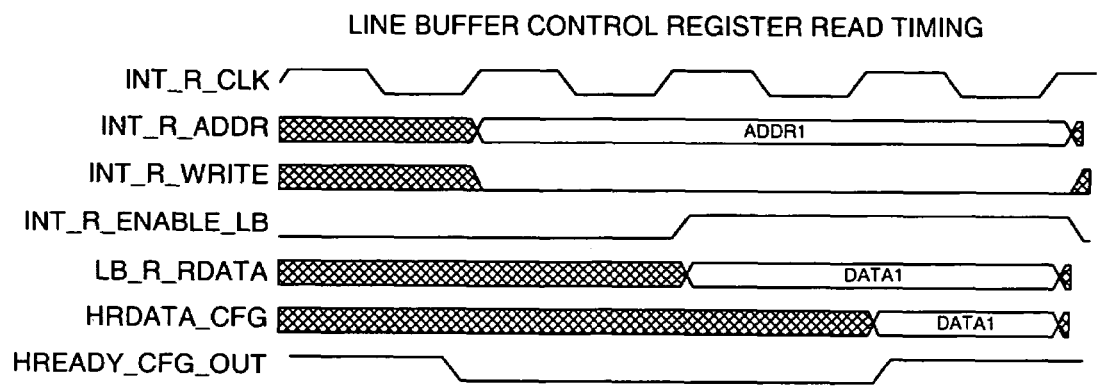
FIG. 7 is a timing diagram for reading from control registers.
Figure 8:
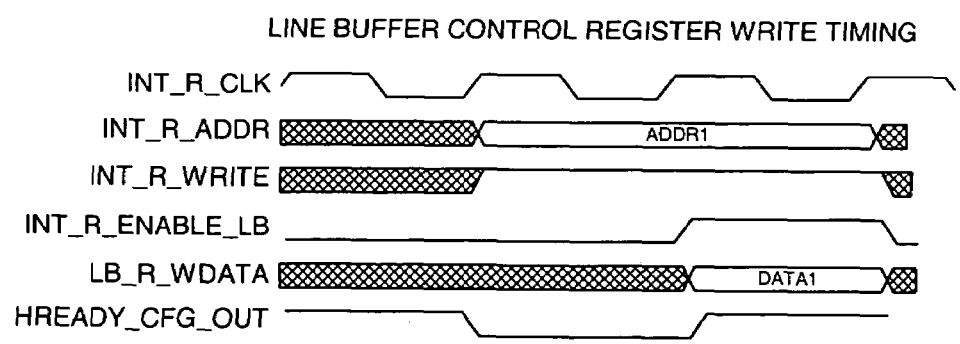
FIG. 8 is a timing diagram for writing to control registers.

Referring to FIGS. 7 and 8, timing diagrams for writing and reading control registers are shown. The timing for the signals may be designed to maximize throughput while minimizing potential timing problems for the registers being read and written. For example, reads of the register bus 137 may insert two wait cycles on the AHB bus 119, while the writes may insert one wait cycle.

Referring to FIG. 7, during a basic read operation, the address signal INT_R_ADDR, control signals INT_R_WRITE, and enable signal INT_R_ENABLE_LB may be driven to the line buffer circuit 102. The line buffer circuit 102 may steer the data back in the data signal LB_R_RDATA. The data signal LB_R_RDATA may be registered by the clock HCLK within the configuration port circuit 104 and driven out onto the AHB Bus 119 using a data signal (e.g., HRDATA_CFG) and a ready signal (e.g., HREADY_CFG_OUT). Referring to FIG. 8, during a basic write operation, the address signal INT_R_ADDR, the control signal INT_R_WRITE, the enable signal INT_R_ENABLE_LB and the data signal INT_R_WRDATA may be driven to the line buffer circuit 102. A single wait state may be inserted.

A basic datapath and flow may be the same for most of the read cases by the line buffer circuits 102a-d from the peripheral controller circuit 110/external peripheral circuit 120. Therefore, complete descriptions of the entire datapath and flow may not included for each case. The field widths relating to data paths in the following figures may be examples of one configuration. Other configurations and widths may be implemented to meet a criteria of a particular application. Delays from the arbiter circuit 106 and the peripheral controller circuit 110 shown may be arbitrary and may be quite different in a given situation.

Figure 9:
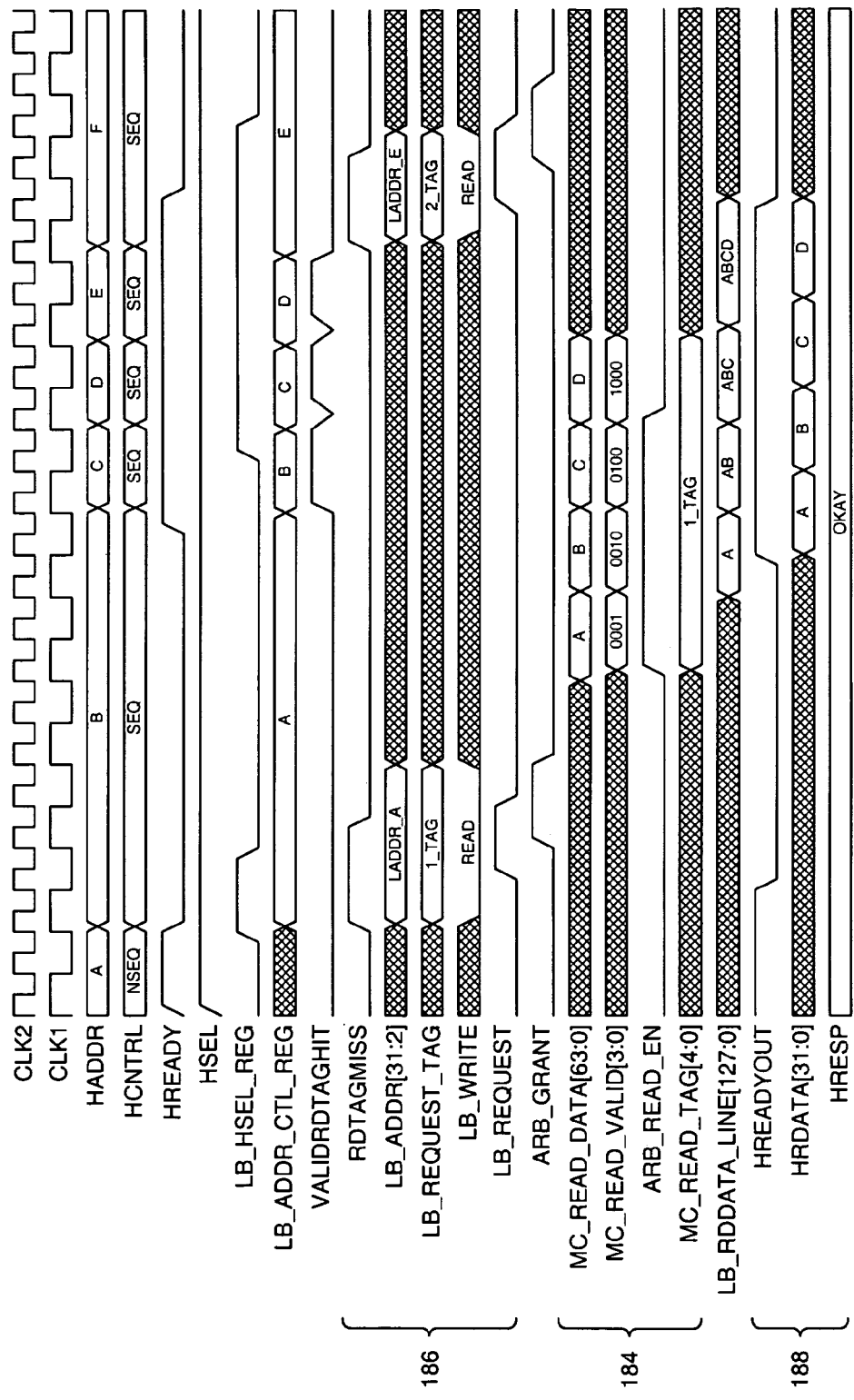
FIG. 9 is a timing diagram of an example basic read with a 4-beat internal mode without prefetching from the peripheral controller circuit.

Referring to FIG. 9, a timing diagram of an example basic read from the peripheral controller circuit 110 is shown. The example may depict the read without prefetching a next line. The line buffer circuit 102 may be configured for a 4-beat mode or transfer (e.g., bracket 184).

The AHB requested read data may not be in a current read register or buffer. Therefore, the read may be decoded as a read miss which generally triggers a line read from the peripheral controller circuit 110. The line buffer circuit 102 read may include driving out the address and control signals followed by driving the signal LB_REQUEST to the arbiter one-half a cycle of the clock CLK1 later (e.g., bracket 186)

After access to the peripheral controller circuit 110 may be granted by the arbiter circuit 106, the line buffer circuit 102 may wait for the data from the peripheral controller circuit 110, which may be indicated by the signal ARB_READ_EN being driven high at the rising edge of clock CLK1. Data may transferred per each cycle of the clock CLK1 while the signal ARB_READ_EN is high. The signal MC_READ_VALID generally indicates which fourth of the line may be loaded with the respective transfer. Therefore, four separate reads may occur (e.g., bracket 184). The line buffer circuit 102 may drive the data on the signal HRDATA and assert the signal HREADYOUT as soon as the data may be written in the read register or buffer and the proper internal valid bit may be set (e.g., bracket 188). The design generally allows the requested word to be returned to the AHB master as soon as possible, without waiting on the entire line to be read from the peripheral controller circuit 110.

Figure 10:
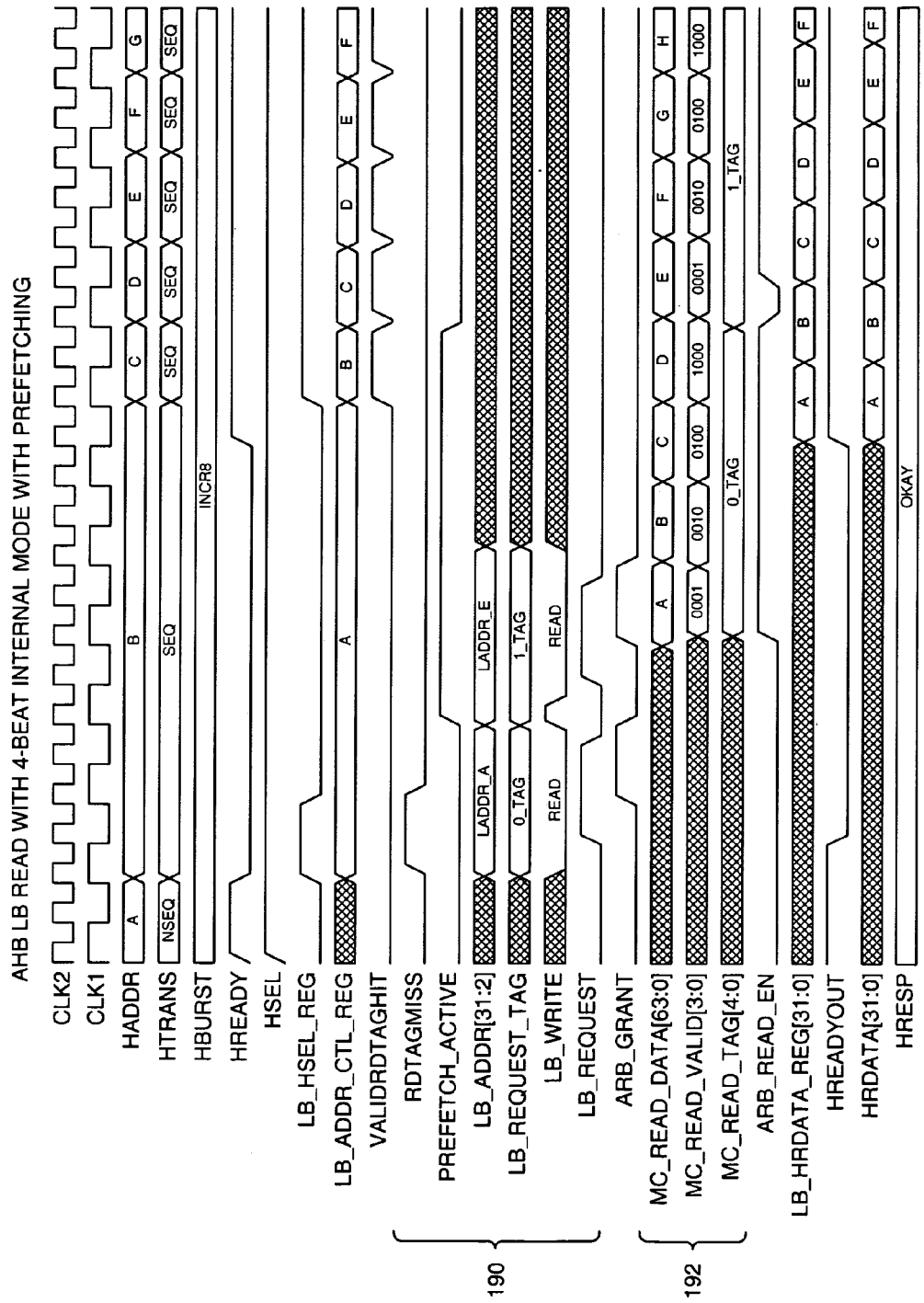
FIG. 10 is a timing diagram of an example basic read with a 4-beat internal mode with prefetching.

Referring to FIG. 10, a timing diagram of an example basic read with a 4-beat internal mode is shown. The read may be performed with prefetching a next line. The example presumes that the requested word may not be present in the line buffer circuit 102 and bit 4 of the read address may be in a logical low state indicating the miss may be to the even line read input register 128a.

The line buffer circuit 102 may respond to the read miss by requesting the even line from the peripheral controller circuit 110. If the line buffer circuit 102 determines that the AHB request is an AHB burst that increments to the odd line, the line buffer circuit 102 may request or prefetch the odd line as soon as the grant for the even request may be sampled (e.g., bracket 190). The peripheral controller circuit 110 may therefore return both lines when available (e.g., bracket 192).

Figure 11:
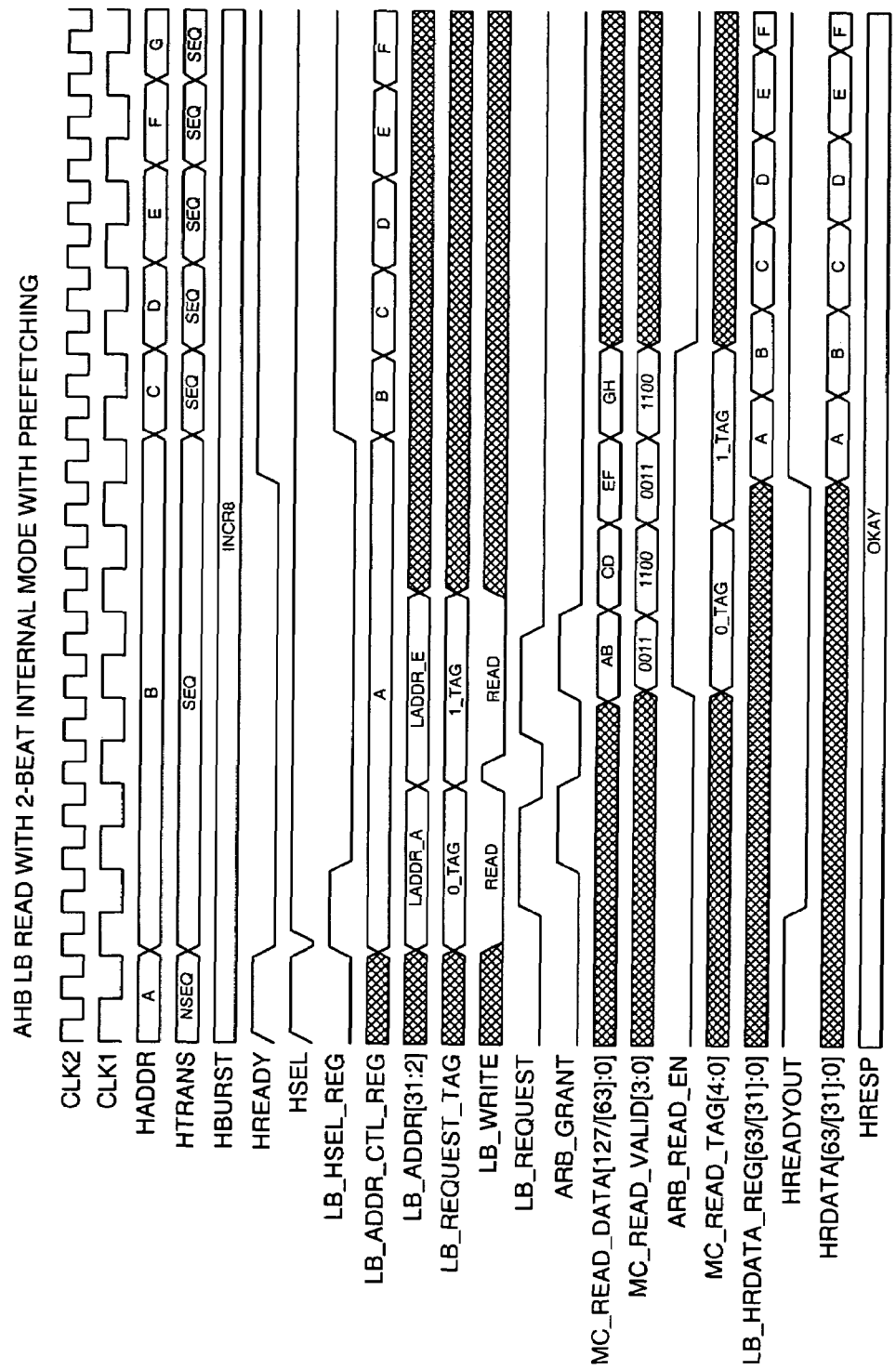
FIG. 11 is a timing diagram of an example read with a 2-beat internal mode with prefetching.

Referring to FIG. 11, a timing diagram of an example read with a 2-beat internal mode with prefetching is shown. FIG. 11 may be the same case as shown in FIG. 10, except that the system 100 may be configured for 2-beat internal mode. A difference between 2-beat internal and 4-beat internal mode may be a number of data transfers for each peripheral read or write. Generally, the 2-beat mode may utilize a data-path that may be twice as wide as that used for 4-beat mode.

Figure 12:
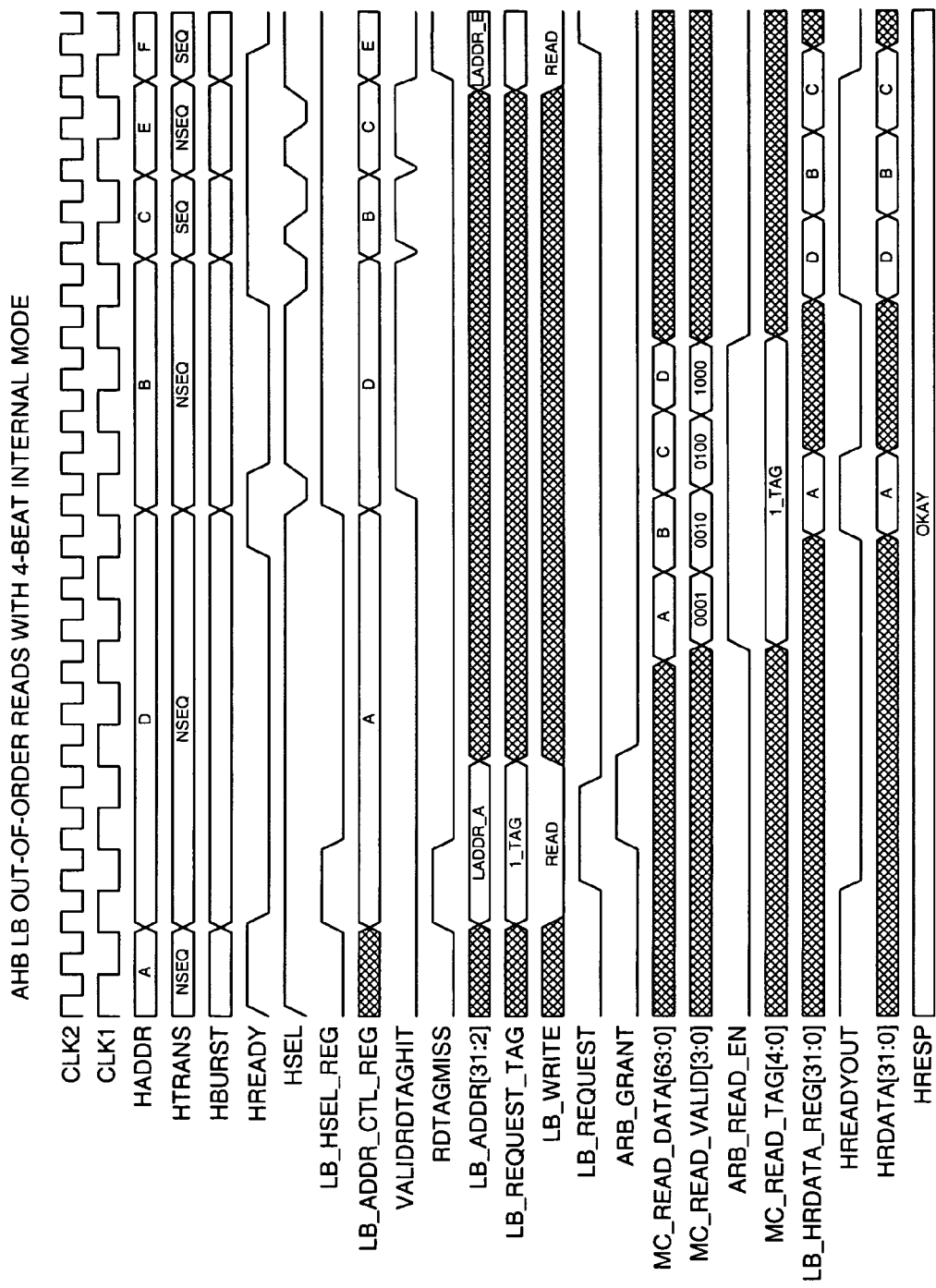
FIG. 12 is a timing diagram of an example out-of-order read.

Referring to FIG. 12, a timing diagram of an example out-of-order read is shown. An AHB Master may request reads from a line buffer circuit 102 using addresses that may be out-of-order non-sequential addresses (e.g, A, D, B, . . . ). The line buffer circuit 102 may insert wait cycles between cycles until the requested out-of-order data may be loaded into the read input register or buffer. In the example, cycle D may be requested out-of-order.

Figure 13:
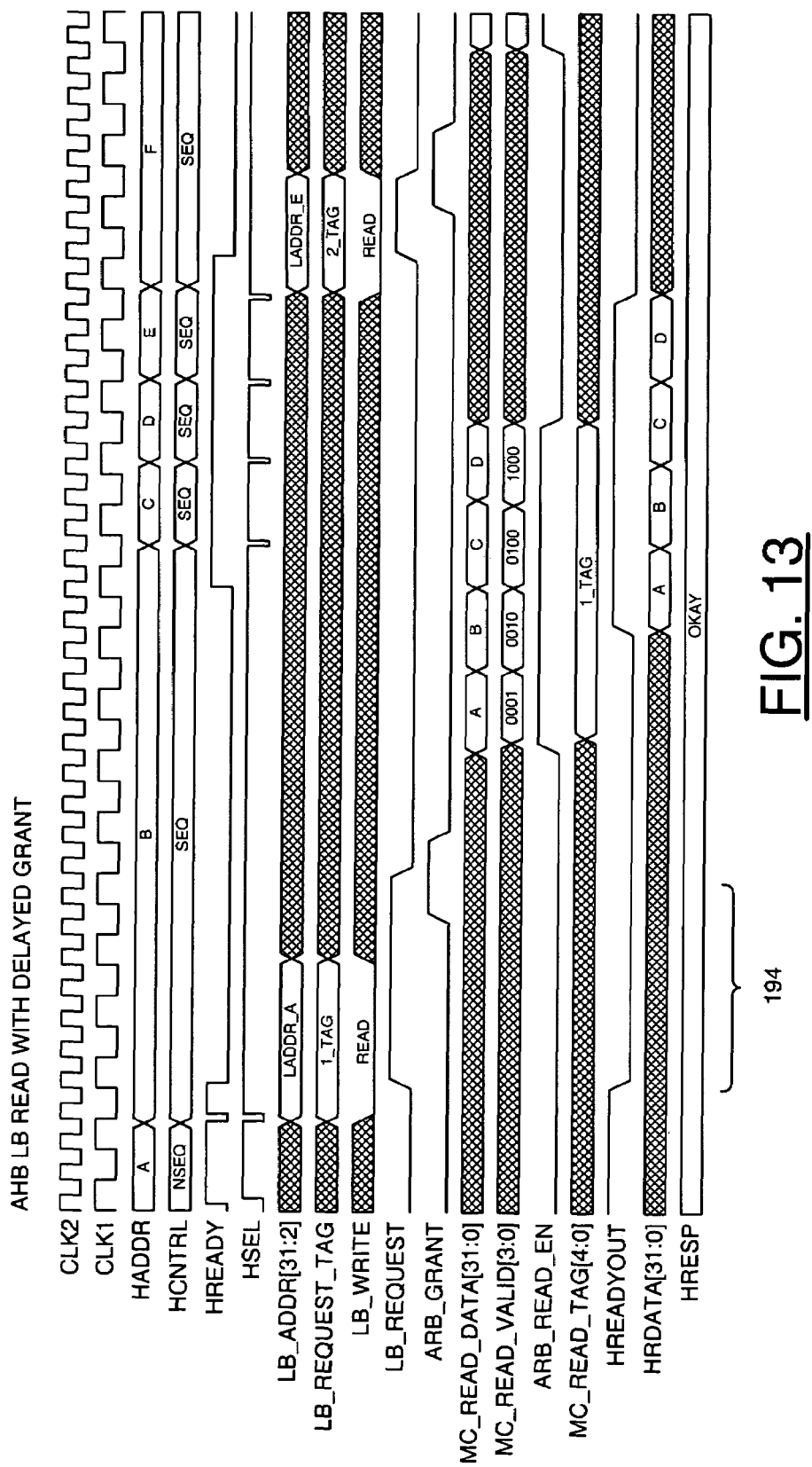
FIG. 13 is a timing diagram of an example read having a delayed grant.

Referring to FIG. 13, a timing diagram of an example read having a delayed grant is shown. The example shown in FIG. 13 is generally identical to the example shown in FIG. 9 with an exception that the grant from the arbiter circuit 106 may be delayed. As shown, the arbitration latency (e.g., bracket 194) may directly delay the read cycle.

Figure 14:
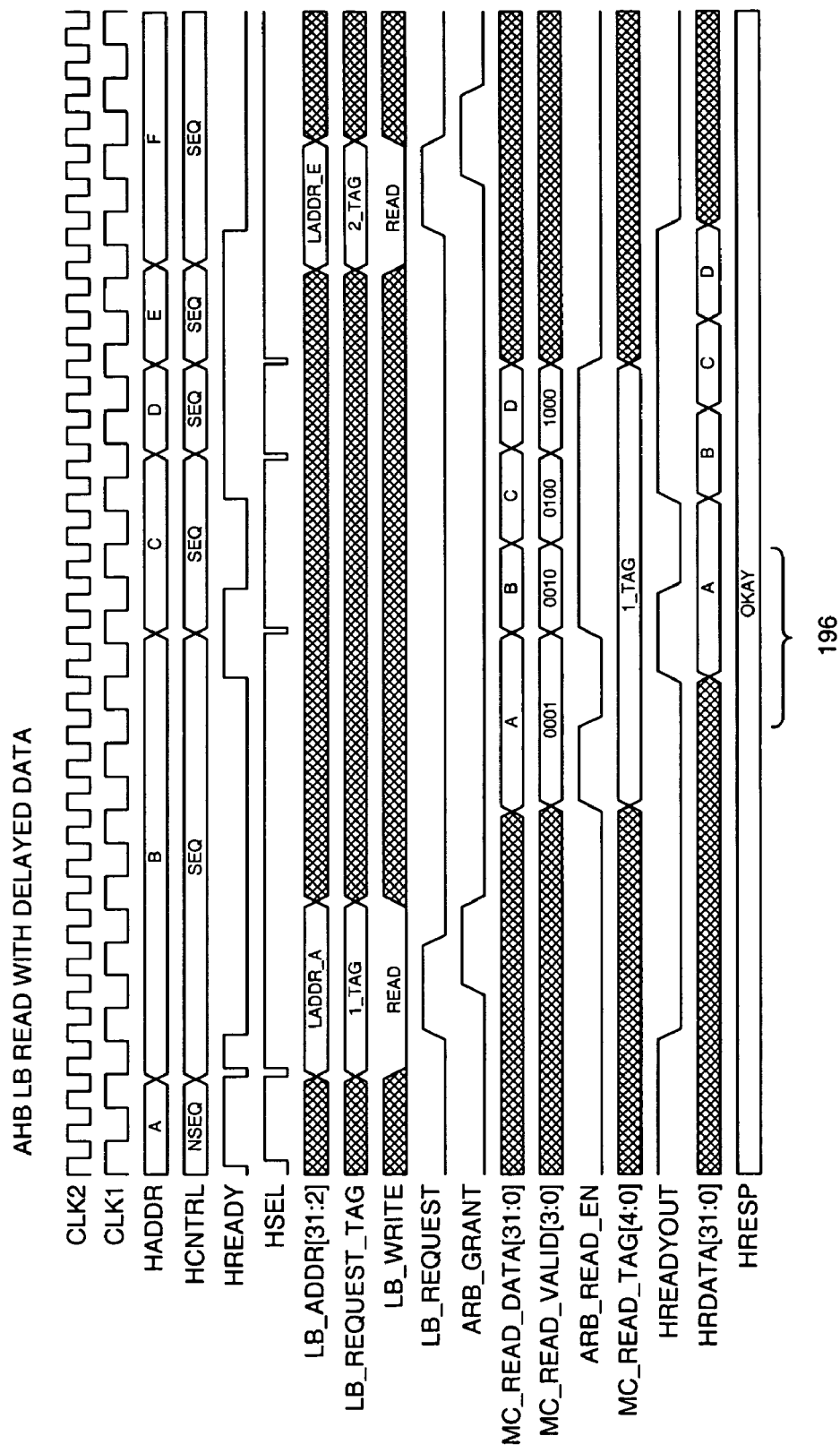
FIG. 14 is a timing diagram of an example read delayed by the peripheral controller circuit.

Referring to FIG. 14, a timing diagram of an example read delayed by the peripheral controller circuit 110 is shown. A delay (e.g., bracket 196) in the data item A may be caused by deasserting the enable signal ARB_READ_EN for a cycle. The delay in the enable signal ARB_READ_EN may be due to a delay from the peripheral controller circuit 110 informing the arbiter circuit 106 that the data may be ready.

A basic datapath and flow may be the same for most write cases. Therefore, complete descriptions of the entire datapath and flow may not be included for each case and example below. The following diagrams generally depict a particular configuration mode of a line buffer circuit 102. Other configuration modes may be implemented to meet a criteria of a particular application.

Figure 15:
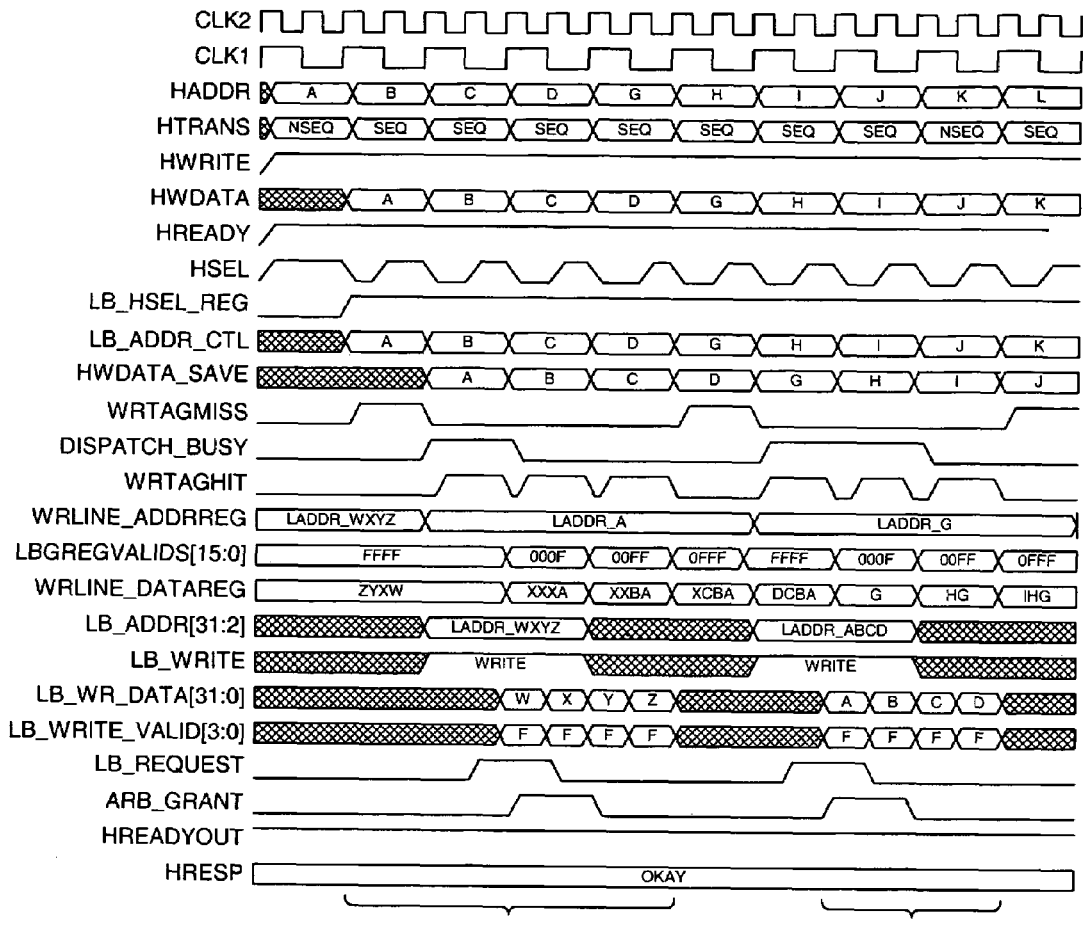
FIG. 15 is a timing diagram of an example write with a 4-beat internal mode.

Referring to FIG. 15, a timing diagram of an example write with a 4-beat internal mode is shown. An existing line of data "WXYZ" in the write registers or buffers may be dispatched by a NSEQ cycle "A" (e.g., bracket 198). The following sequential cycles "BCDGHIJ" may complete an INCR 8 cycle initiated by an AHB master. The line buffer circuit 102 may split the 8-word line up into two 4-word transfers to the peripheral controller circuit 110 (e.g., bracket 200 may illustrate a first of the two transfers).

The line buffer circuit 102 generally does not insert wait states on the AHB bus 118 by deasserting the ready signal HREADY. The lack of wait state on the AHB bus 118 may be possible when arbitration latency may be no more than one or two clock cycles. The line buffer circuit 102 generally has no mechanism to delay write data once the signal ARB_GRANT may be asserted.

Figure 16:
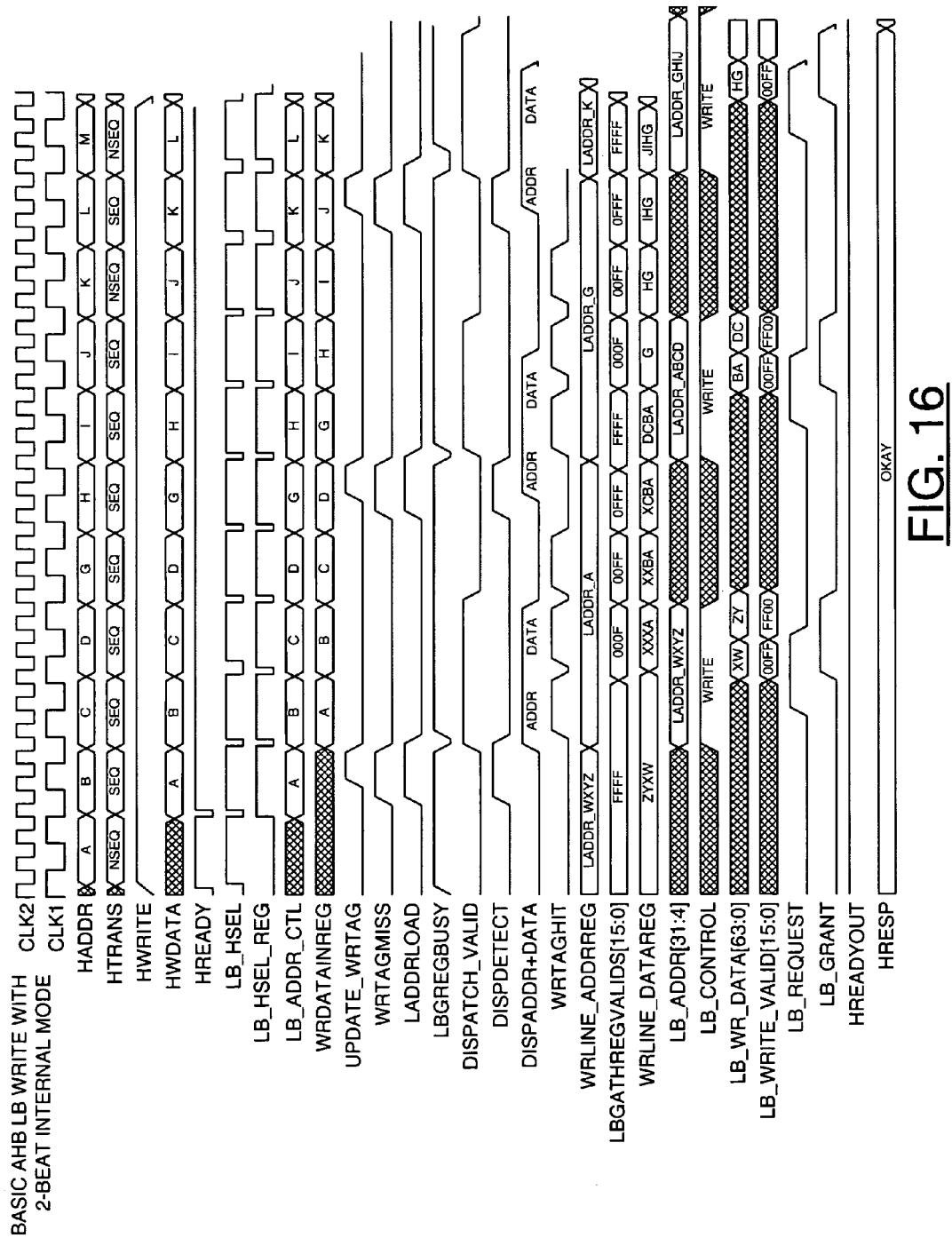
FIG. 16 is a timing diagram of an example write having a 2-beat internal mode.

Referring to FIG. 16, a timing diagram of an example write having a 2-beat internal mode is shown. A series of INCR 8 cycles on the AHB bus 118 may be targeted to a line buffer circuit 102 that may be configured for 2-beat internal mode. The 2-beat internal mode generally differs from the 4-beat internal mode in that the data path for the 2-beat internal mode may be wider. For example, the 2-beat internal mode may utilize a 64-bit or 128-bit data path and the signal LB_WRITE_VALID may have 8 or 16 bits such that one bit maps to each byte of data being transferred. The example presumes that the write output register may be initially loaded with an undispatched line "WXYZ", which may be dispatched by the NSEQ cycle "A".

Referring to FIG. 17, a timing diagram of an example write with an arbitration delay is shown. The arbitration delay may cause the line buffer circuit 102 to insert a wait state on the AHB Bus 118. The line buffer circuit 102 may hold signals to the arbiter circuit 106 until the signal ARB_GRANT may be sampled as asserted. Once the signal ARB_GRANT may be asserted, data may be switched on clock CLK2 boundaries until the entire line has been transferred.

The various signals of the present invention are generally "on" (e.g., a digital HIGH, or 1) or "off" (e.g., a digital LOW, or 0). However, the particular polarities of the on (e.g., asserted) and off (e.g., deasserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same-point in time, end at the same point in time, or have the same duration. The various signals of the present invention may be implemented as single-bit or multi-bit signals in a serial and/or parallel configuration.

While the invention has been particularly shown and described with reference to the preferred embodiments thereof, it will be understood by those skilled in the art that various changes in form and details may be made without departing from the spirit and scope of the invention.

The invention claimed is:

1. A method of accessing a memory through a circuit, comprising the steps of:
   (A) buffering both a first read data and a second read data received within a plurality of first transfers from said memory to a read input register of said circuit in response to a first read command that has a first read address of said first read data;
   (B) loading said first read data, from said read input register to a read output register of said circuit;
   (C) transmitting said first read data in a second transfer from said read output register to outside of said circuit;
   (D) buffering a first write data received in a third transfer to a write input register of said circuit;
   (E) loading said first write data from said write input register to a write output register of said circuit;
   (F) transmitting said first write data within a plurality of fourth transfers from said write output register to said memory; and
   (G) loading said second read data from said read input register to said read output register after said second transfer of said first read data from said read output register in response to a second read command that has a second read address matching a first read address tag of said first read data.

2. The method according to claim 1, wherein said transmitting of said first write data to said memory is in response to said first read address matching a first write address tag of said first write data.

3. The method according to claim 2, further comprising the step of:
   generating a cache read miss in response to said first read address matching said first write address tag.

4. The method according to claim 3, further comprising the step of:
   reading said first write data, from said memory to said read input register in response to said cache read miss.

5. The method according to claim 1, wherein said transmitting of said first write data to said memory is in response to receiving said first read command while a control data is in a particular state.

6. The method according to claim 1, wherein said transmitting of said first write data to said memory is in response to a timeout function expiring within said circuit.

7. The method according to claim 1, further comprising the steps of:
   monitoring a second write data generated external to said circuit; and
   invaliding said second read data buffered within said read input register in response to a second write address of said second write data matching a second read address tag of said second read data.

8. The method according to claim 1, further comprising the steps of:
   requesting said first read data from said memory; and
   re-requesting said first read data from said memory in response to detecting a second write data (i) generated external to said circuit and (ii) having said first read address prior to receiving said first read data from said memory.

9. The method according to claim 1, further comprising the step of:
   ignoring an unaligned address bit in response to receiving a new address having said unaligned address bit.

10. A circuit comprising:
    means for first buffering both a first read data and second read data received within a plurality of first transfer's from a memory in response to a first read command that has a first read address of said first read data;
    means for first transmitting said first read data in a second transfer to outside of said circuit after loading said first read data from said means for first buffering to said means for first transmitting;
    means for second buffering a first write data received in a third transfer; means for second transmitting said first write data within a plurality of fourth transfers to said memory after loading said first read data from said means for second buffering to said means for second transmitting; and
    means for loading said second read data from said means for first buffering to said means for first transmitting after said second transfer of said first read data from means for first transmitting in response to a second read command that has a second read address matching a first read address tag of said first read data.

11. A method of accessing a memory through a circuit, comprising the steps of:
    (A) buffering a first read data received within a plurality of first transfers from said memory to a read input register of said circuit;
    (B) loading said first read data from said read input register to a read output register of said circuit;
    (C) transmitting said first read data in a second transfer from said read output register to outside of said circuit;
    (D) buffering a first write data, received in a third transfer to a write input register of said circuit;
    (E) moving said first write data from said write input register to a gathering register in response to a first address of said first write data matching an address tag of a second write data currently buffered in said gathering register, said second write data having a second address;
    (F) moving both of said first write data and said second write data and said second write data from said gathering register to a write output register of said circuit; and
    (G) transmitting both said first write data and said second write data within a plurality of fourth transfers from said write output register to said memory.

12. The method according to claim 11, further comprising the steps of:
    receiving a third write data in said write input register, wherein said moving of both said first write data and said second write data from said gathering register to said write output register occurs in response to said second address tag of said second write data not matching a third address tag of said third write data.

13. The method according to claim 11, further comprising the step of:
    receiving a read command in a control register, wherein said moving of both said first write data and said second write data from said gathering register to said write output register occurs in response to said address tag of said second write data matching a third address of said read command.

14. The method according to claim 11, further comprising the of:
    receiving a lock command in a control register wherein said moving of both said first write data and said second write data from said gathering register to said write output register occurs, in response to said lock command in having an asserted state.

15. The method according to claim 11, further comprising the step of:
    receiving a read command in a control register, wherein said moving of both said first write data and said second write data from said gathering register to said write output register occurs before servicing with of said read command.

16. The method according to claim 11, wherein said moving of both said first write data and said second write data, from said gathering register to said write output register occurs in response to a timeout function expiring within said circuit.

17. The method according to claim 11, further comprising the step of:
    receiving a protected write command in a control register, said protected write command corresponding to said first write data, wherein said moving of said first write data from said gathering register to said write output register occurring in response to said protected write command having an unbuffered state.

18. The method according to claim 11, further comprising the steps of:
   asserting an arbitration request data to an arbiter in response to buffering said first write data.

19. The method according to claim 18, further comprising the step of:
   holding said first write data in said write output register until an arbitration grant data is received from said arbiter.

20. The method according to claim 11, further comprising the step of:
   generating a write enable data having a plurality of bits, each of said bits indicating a validity of a respective byte of a plurality of bytes in said transmitting of said first write data from said write output register to said memory.

* * * * *